(12) United States Patent
Oza et al.

(10) Patent No.: US 12,489,805 B2
(45) Date of Patent: Dec. 2, 2025

(54) RECEIVER INITIATED MIRRORING SESSION

(71) Applicant: Apple Inc., Cupertino, CA (US)

(72) Inventors: Shardul Oza, Santa Clara, CA (US); Vikrant Kasarabada, Los Altos, CA (US); Tu K. Nguyen, Fountain Valley, CA (US); Virata Yindeeyoungyeon, San Jose, CA (US); Gennadiy Shekhtman, Campbell, CA (US); Christopher B. Fleizach, Gilroy, CA (US)

( * ) Notice: Subject to any disclaimer, the term of this patent is extended or adjusted under 35 U.S.C. 154(b) by 0 days.

(21) Appl. No.: 18/379,128

(22) Filed: Oct. 11, 2023

(65) Prior Publication Data

US 2024/0357002 A1   Oct. 24, 2024

Related U.S. Application Data

(60) Provisional application No. 63/496,931, filed on Apr. 18, 2023.

(51) Int. Cl.
*H04L 67/025* (2022.01)
*H04L 9/40* (2022.01)

(52) U.S. Cl.
CPC .......... *H04L 67/025* (2013.01); *H04L 63/061* (2013.01)

(58) Field of Classification Search
CPC .......................... H04L 67/025; H04L 63/061
See application file for complete search history.

(56) References Cited

U.S. PATENT DOCUMENTS

| 2013/0298208 | A1 | 11/2013 | Ayed | |
|---|---|---|---|---|
| 2014/0105198 | A1* | 4/2014 | Banerjea | H04W 76/15 370/338 |
| 2014/0120829 | A1* | 5/2014 | Bhamidipati | H04W 76/10 455/3.06 |
| 2016/0099920 | A1* | 4/2016 | Meuleman | H04L 63/18 713/153 |
| 2016/0241605 | A1* | 8/2016 | Taboriskiy | H04W 4/80 |
| 2016/0378417 | A1* | 12/2016 | Kenjalkar | G06F 3/1423 345/2.2 |
| 2018/0091501 | A1* | 3/2018 | Trahe | H04W 12/068 |
| 2019/0079557 | A1* | 3/2019 | Jung | G06F 1/1605 |
| 2019/0172051 | A1* | 6/2019 | Lee | G06Q 20/321 |
| 2019/0265938 | A1* | 8/2019 | Kim | G06F 3/1423 |
| 2020/0139231 | A1* | 5/2020 | Colenbrander | H04N 21/63 |
| 2022/0095011 | A1* | 3/2022 | Lee | H04N 21/458 |
| 2022/0216936 | A1* | 7/2022 | Lazzaro | H04W 12/03 |
| 2022/0272420 | A1* | 8/2022 | Tucker | H04N 21/64738 |

(Continued)

FOREIGN PATENT DOCUMENTS

| CN | 112804213 A | 5/2021 |
|---|---|---|
| EP | 2166732 A1 | 3/2010 |
| EP | 3907972 A1 | 11/2021 |

OTHER PUBLICATIONS

International Patent Application No. PCT/US2024/024425; Invitation to Pay Add'l Fees; dated Sep. 10, 2024; 12 pages.

(Continued)

*Primary Examiner* — Chris Parry
*Assistant Examiner* — Steven C Nguyen

(57) ABSTRACT

The present disclosure generally relates to communicating between computer systems, and more specifically to techniques for communicating user interface content.

54 Claims, 11 Drawing Sheets

(56) References Cited

U.S. PATENT DOCUMENTS

| | | | |
|---|---|---|---|
| 2023/0008070 A1* | 1/2023 | Huang | H04N 21/43637 |
| 2023/0199034 A1* | 6/2023 | Li | H04W 76/10 |
| | | | 709/228 |
| 2023/0376131 A1* | 11/2023 | Zeung | G06F 3/1454 |
| 2024/0121840 A1* | 4/2024 | Wu | H04W 76/14 |

OTHER PUBLICATIONS

International Patent Application No. PCT/US2024/024425; Int'l Search Report and the Written Opinion; dated Oct. 31, 2024; 19 pages.

* cited by examiner

RECEIVER INITIATED MIRRORING SESSION

CROSS-REFERENCE TO RELATED APPLICATIONS

This application claims priority to U.S. Provisional Patent Application No. 63/496,931, "Receiver Initiated Mirroring Session," filed Apr. 18, 2023, which is incorporated by reference herein in its entirety.

FIELD

The present disclosure relates generally to communicating between computer systems, and more specifically to techniques for communicating user interface content.

BACKGROUND

Peer-to-peer communication typically uses a distributed network architecture where computer systems on the network can act as both clients and servers, enabling them to exchange information and resources directly with each other.

SUMMARY

Current techniques for communicating data between computer systems are generally ineffective and/or inefficient. For example, some techniques require users to open an application of a computer system and set up a connection with a different computer system through communications between the application and the different computer system. This disclosure provides more effective and/or efficient techniques for communicating data between computer systems using examples of applications of a smartphone connecting with a wearable device. It should be recognized that other types of computer systems can be used with techniques described herein. For example, a smartphone can connect with a laptop using techniques described herein. In addition, techniques optionally complement or replace other techniques for communicating data between computer systems.

Some techniques are described herein for communicating data between computer systems.

In some embodiments, a method that is performed at a first computer system is described. In some embodiments, the method comprises: while the first computer system is connected, via a first communication channel, to a second computer system: receiving, from the second computer system, connection data for a second communication channel different from the first communication channel; using the connection data to connect to the second computer system via the second communication channel; and sending, via the second communication channel, media output data to the second computer system.

In some embodiments, a non-transitory computer-readable storage medium storing one or more programs configured to be executed by one or more processors of a first computer system is described. In some embodiments, the one or more programs includes instructions for: while the first computer system is connected, via a first communication channel, to a second computer system: receiving, from the second computer system, connection data for a second communication channel different from the first communication channel; using the connection data to connect to the second communication channel; and sending, via the second communication channel, media output data to the second computer system.

In some embodiments, a transitory computer-readable storage medium storing one or more programs configured to be executed by one or more processors of a first computer system is described. In some embodiments, the one or more programs includes instructions for: while the first computer system is connected, via a first communication channel, to a second computer system: receiving, from the second computer system, connection data for a second communication channel different from the first communication channel; using the connection data to connect to the second computer system via the second communication channel; and sending, via the second communication channel, media output data to the second computer system.

In some embodiments, a first computer system is described. In some embodiments, the first computer system comprises one or more processors and memory storing one or more program configured to be executed by the one or more processors. In some embodiments, the one or more programs includes instructions for: while the first computer system is connected, via a first communication channel, to a second computer system: receiving, from the second computer system, connection data for a second communication channel different from the first communication channel; using the connection data to connect to the second computer system via the second communication channel; and sending, via the second communication channel, media output data to the second computer system.

In some embodiments, a first computer system is described. In some embodiments, the first computer system comprises means for performing each of the following steps: while the first computer system is connected, via a first communication channel, to a second computer system: receiving, from the second computer system, connection data for a second communication channel different from the first communication channel; using the connection data to connect to the second computer system via the second communication channel; and sending, via the second communication channel, media output data to the second computer system.

In some embodiments, a computer program product is described. In some embodiments, the computer program product comprises one or more programs configured to be executed by one or more processors of a first computer system. In some embodiments, the one or more programs include instructions for: while the first computer system is connected, via a first communication channel, to a second computer system: receiving, from the second computer system, connection data for a second communication channel different from the first communication channel; using the connection data to connect to the second computer system via the second communication channel; and sending, via the second communication channel, media output data to the second computer system.

In some embodiments, a method that is performed at a first computer system is described. In some embodiments, the method comprises: sending, to a second computer system, a first request for the second computer system to join a communication channel, wherein the first request includes first connection data; subsequent to sending the first request: in accordance with a determination that a valid response is not received from the second computer system within a threshold period of time, sending, to the second computer system, a second request for the second computer system to join the communication channel, wherein the second request includes second connection data that is different from the first connection data; and in accordance with a determination that a valid response is received from the second computer system within the threshold period of time, connecting with the second computer system via the communication channel.

In some embodiments, a non-transitory computer-readable storage medium storing one or more programs configured to be executed by one or more processors of a first computer system is described. In some embodiments, the one or more programs includes instructions for: sending, to a second computer system, a first request for the second computer system to join a communication channel, wherein the first request includes first connection data; subsequent to sending the first request: in accordance with a determination that a valid response is not received from the second computer system within a threshold period of time, sending, to the second computer system, a second request for the second computer system to join the communication channel, wherein the second request includes second connection data that is different from the first connection data; and in accordance with a determination that a valid response is received from the second computer system within the threshold period of time, connecting with the second computer system via the communication channel.

In some embodiments, a transitory computer-readable storage medium storing one or more programs configured to be executed by one or more processors of a first computer system is described. In some embodiments, the one or more programs includes instructions for: sending, to a second computer system, a first request for the second computer system to join a communication channel, wherein the first request includes first connection data; subsequent to sending the first request: in accordance with a determination that a valid response is not received from the second computer system within a threshold period of time, sending, to the second computer system, a second request for the second computer system to join the communication channel, wherein the second request includes second connection data that is different from the first connection data; and in accordance with a determination that a valid response is received from the second computer system within the threshold period of time, connecting with the second computer system via the communication channel.

In some embodiments, a first computer system is described. In some embodiments, the first computer system comprises one or more processors and memory storing one or more program configured to be executed by the one or more processors. In some embodiments, the one or more programs includes instructions for: sending, to a second computer system, a first request for the second computer system to join a communication channel, wherein the first request includes first connection data; subsequent to sending the first request: in accordance with a determination that a valid response is not received from the second computer system within a threshold period of time, sending, to the second computer system, a second request for the second computer system to join the communication channel, wherein the second request includes second connection data that is different from the first connection data; and in accordance with a determination that a valid response is received from the second computer system within the threshold period of time, connecting with the second computer system via the communication channel.

In some embodiments, a first computer system is described. In some embodiments, the first computer system comprises means for performing each of the following steps: sending, to a second computer system, a first request for the second computer system to join a communication channel, wherein the first request includes first connection data; subsequent to sending the first request: in accordance with a determination that a valid response is not received from the second computer system within a threshold period of time, sending, to the second computer system, a second request for the second computer system to join the communication channel, wherein the second request includes second connection data that is different from the first connection data; and in accordance with a determination that a valid response is received from the second computer system within the threshold period of time, connecting with the second computer system via the communication channel.

In some embodiments, a computer program product is described. In some embodiments, the computer program product comprises one or more programs configured to be executed by one or more processors of a first computer system. In some embodiments, the one or more programs include instructions for: sending, to a second computer system, a first request for the second computer system to join a communication channel, wherein the first request includes first connection data; subsequent to sending the first request: in accordance with a determination that a valid response is not received from the second computer system within a threshold period of time, sending, to the second computer system, a second request for the second computer system to join the communication channel, wherein the second request includes second connection data that is different from the first connection data; and in accordance with a determination that a valid response is received from the second computer system within the threshold period of time, connecting with the second computer system via the communication channel.

In some embodiments, a method that is performed at a first computer system is described. In some embodiments, the method comprises: sending to a second computer system: one or more user interface elements of the first computer system; and a mapping that includes one or more action identifiers corresponding to one or more UI elements of the first computer system; receiving, from the second computer system, an action identifier of the one or more action identifiers, wherein the action identifier is associated with a UI element of the one or more UI elements; and in response to receiving the action identifier associated with the UI element, performing an action associated with the action identifier.

In some embodiments, a non-transitory computer-readable storage medium storing one or more programs configured to be executed by one or more processors of a first computer system is described. In some embodiments, the one or more programs includes instructions for: sending to a second computer system: one or more user interface elements of the first computer system; and a mapping that includes one or more action identifiers corresponding to the one or more UI elements of the first computer system; receiving, from the second computer system, an action identifier of the one or more action identifiers, wherein the action identifier is associated with a UI element of the one or more UI elements; and in response to receiving the action identifier associated with the UI element, performing an action associated with the action identifier.

In some embodiments, a transitory computer-readable storage medium storing one or more programs configured to be executed by one or more processors of a first computer system is described. In some embodiments, the one or more programs includes instructions for: sending to a second computer system: one or more user interface elements of the first computer system; and a mapping that includes one or more action identifiers corresponding to the one or more UI elements of the first computer system; receiving, from the second computer system, an action identifier of the one or more action identifiers, wherein the action identifier is associated with a UI element of the one or more UI elements; and in response to receiving the action identifier associated with the UI element, performing an action associated with the action identifier.

In some embodiments, a first computer system is described. In some embodiments, the first computer system comprises one or more processors and memory storing one or more program configured to be executed by the one or more processors. In some embodiments, the one or more programs includes instructions for: sending to a second computer system: one or more user interface elements of the first computer system; and a mapping that includes one or more action identifiers corresponding to the one or more UI elements of the first computer system; receiving, from the second computer system, an action identifier of the one or more action identifiers, wherein the action identifier is associated with a UI element of the one or more UI elements; and in response to receiving the action identifier associated with the UI element, performing an action associated with the action identifier.

In some embodiments, a first computer system is described. In some embodiments, the first computer system comprises means for performing each of the following steps: sending to a second computer system: one or more user interface elements of the first computer system; and a mapping that includes one or more action identifiers corresponding to the one or more UI elements of the first computer system; receiving, from the second computer system, an action identifier of the one or more action identifiers, wherein the action identifier is associated with a UI element of the one or more UI elements; and in response to receiving the action identifier associated with the UI element, performing an action associated with the action identifier.

In some embodiments, a computer program product is described. In some embodiments, the computer program product comprises one or more programs configured to be executed by one or more processors of a first computer system. In some embodiments, the one or more programs include instructions for: sending to a second computer system: one or more user interface elements of the first computer system; and a mapping that includes one or more action identifiers corresponding to the one or more UI elements of the first computer system; receiving, from the second computer system, an action identifier of the one or more action identifiers, wherein the action identifier is associated with a UI element of the one or more UI elements; and in response to receiving the action identifier associated with the UI element, performing an action associated with the action identifier.

In some embodiments, a method that is performed at a first computer system is described. In some embodiments, the method comprises: receiving from a second computer system: one or more user interface elements of the second computer system; and a mapping that includes an action identifier mapped to a UI element of the one or more UI elements of the second computer system, wherein the action identifier is associated with a first type of input at the second computer system; detecting an input associated with the UI element of the one or more UI elements, wherein the input is a second type of input that is different from the first type of input; and in accordance with a determination, using the mapping, that the input that is the second type of input corresponds to the first type of input at the second computer system, sending, to the second computer system, the action identifier associated with the first type of input.

In some embodiments, a non-transitory computer-readable storage medium storing one or more programs configured to be executed by one or more processors of a first computer system is described. In some embodiments, the one or more programs includes instructions for: receiving from a second computer system: one or more user interface elements of the second computer system; and a mapping that includes an action identifier mapped to a UI element of the one or more UI elements of the second computer system, wherein the action identifier is associated with a first type of input at the second computer system; detecting an input associated with the UI element of the one or more UI elements, wherein the input is a second type of input that is different from the first type of input; and in accordance with a determination, using the mapping, that the input that is the second type of input corresponds to the first type of input at the second computer system, sending, to the second computer system, the action identifier associated with the first type of input.

In some embodiments, a transitory computer-readable storage medium storing one or more programs configured to be executed by one or more processors of a first computer system is described. In some embodiments, the one or more programs includes instructions for: receiving from a second computer system: one or more user interface elements of the second computer system; and a mapping that includes an action identifier mapped to a UI element of the one or more UI elements of the second computer system, wherein the action identifier is associated with a first type of input at the second computer system; detecting an input associated with the UI element of the one or more UI elements, wherein the input is a second type of input that is different from the first type of input; and in accordance with a determination, using the mapping, that the input that is the second type of input corresponds to the first type of input at the second computer system, sending, to the second computer system, the action identifier associated with the first type of input.

In some embodiments, a first computer system is described. In some embodiments, the first computer system comprises one or more processors and memory storing one or more programs configured to be executed by the one or more processors. In some embodiments, the one or more programs includes instructions for: receiving from a second computer system: one or more user interface elements of the second computer system; and a mapping that includes an action identifier mapped to a UI element of the one or more UI elements of the second computer system, wherein the action identifier is associated with a first type of input at the second computer system; detecting an input associated with the UI element of the one or more UI elements, wherein the input is a second type of input that is different from the first type of input; and in accordance with a determination, using the mapping, that the input that is the second type of input corresponds to the first type of input at the second computer system, sending, to the second computer system, the action identifier associated with the first type of input.

In some embodiments, a first computer system is described. In some embodiments, the first computer system comprises means for performing each of the following steps: receiving from a second computer system: one or more user interface elements of the second computer system; and a mapping that includes an action identifier mapped to a UI element of the one or more UI elements of the second computer system, wherein the action identifier is associated with a first type of input at the second computer system;

detecting an input associated with the UI element of the one or more UI elements, wherein the input is a second type of input that is different from the first type of input; and in accordance with a determination, using the mapping, that the input that is the second type of input corresponds to the first type of input at the second computer system, sending, to the second computer system, the action identifier associated with the first type of input.

In some embodiments, a computer program product is described. In some embodiments, the computer program product comprises one or more programs configured to be executed by one or more processors of a first computer system. In some embodiments, the one or more programs include instructions for: receiving from a second computer system: one or more user interface elements of the second computer system; and a mapping that includes an action identifier mapped to a UI element of the one or more UI elements of the second computer system, wherein the action identifier is associated with a first type of input at the second computer system; detecting an input associated with the UI element of the one or more UI elements, wherein the input is a second type of input that is different from the first type of input; and in accordance with a determination, using the mapping, that the input that is the second type of input corresponds to the first type of input at the second computer system, sending, to the second computer system, the action identifier associated with the first type of input.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1:
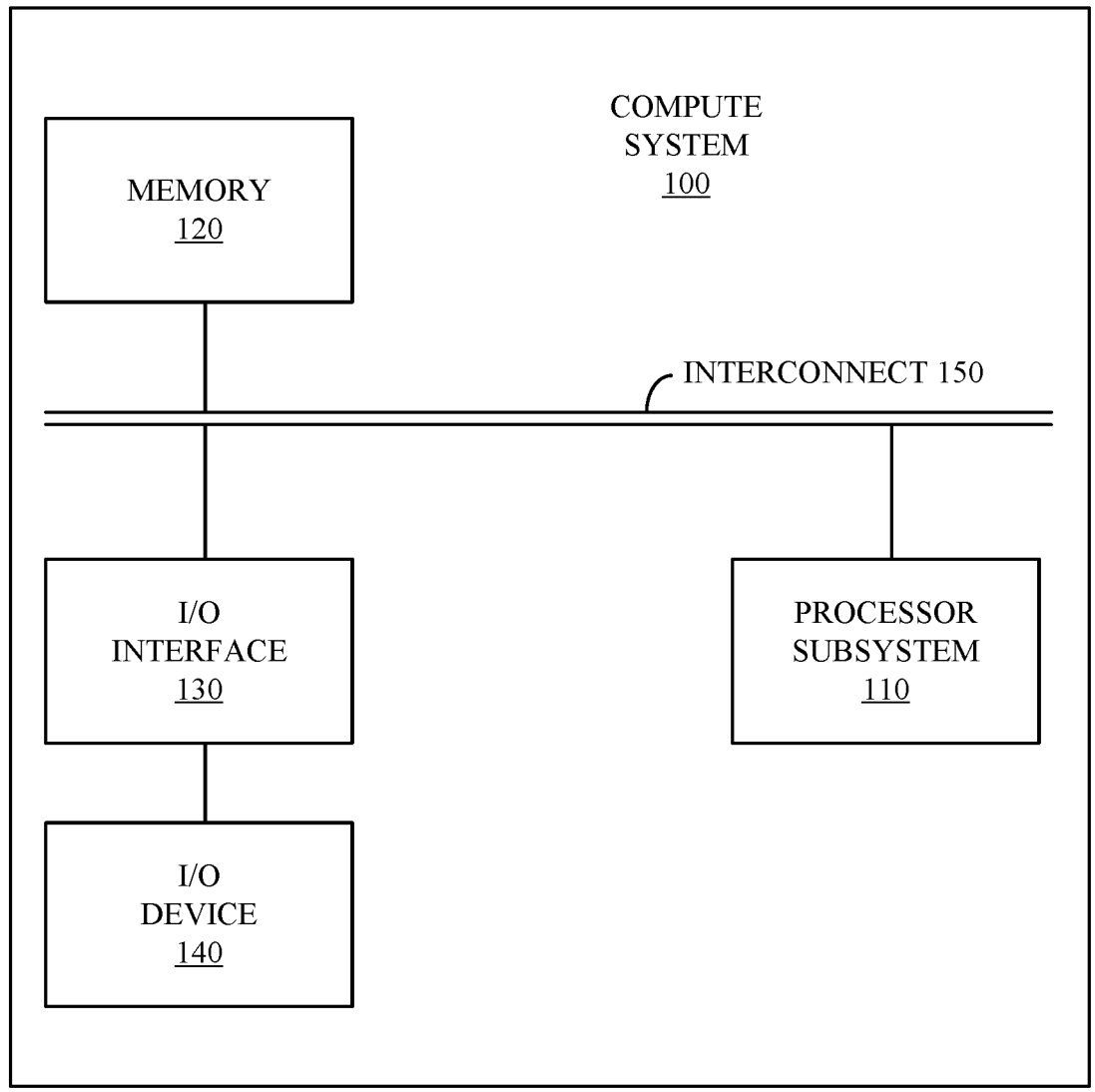
FIG. 1 is a block diagram illustrating a compute system, in accordance with some embodiments.

The following description sets forth exemplary methods, parameters, and the like. It should be recognized, however, that such description is not intended as a limitation on the scope of the present disclosure but is instead provided as a description of exemplary embodiments.

Methods described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is satisfied and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some embodiments, these terms are used to distinguish one element from another. For example, a first subsystem could be termed a second subsystem, and, similarly, a subsystem device could be termed a subsystem device, without departing from the scope of the various described embodiments. In some embodiments, the first subsystem and the second subsystem are two separate references to the same subsystem. In some embodiments, the first subsystem and the second subsystem are both subsystems, but they are not the same subsystem or the same type of subsystem.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some embodiments, I/O interface 130 is included with I/O device 140 such that the two are a single component. It should be recognized that there can be one or more I/O interfaces, with each I/O interface communicating with one or more I/O devices. In some embodiments, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some embodiments, compute system 100 is included or communicating with a physical component for the purpose of modifying the physical component in response to an instruction. In some embodiments, compute system 100 receives an instruction to modify a physical component and, in response to the instruction, causes the physical component to be modified. In some embodiments, the physical component is modified via an actuator, an electric signal, and/or an algorithm. Examples of such physical components include an acceleration control, a break, a gear box, a hinge, a motor, a pump, a refrigeration system, a spring, a suspension system, a steering control, a vacuum system, and/or a valve. In some embodiments, a sensor includes one or more hardware components that detect information about a physical environment in proximity to (e.g., surrounding) the sensor. In some embodiments, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some embodiments, a sensor includes a combination of multiple sensors. In some embodiments, sensor data is captured by fusing data from one sensor with data from one or more other sensors. Although a single compute system is shown in FIG. 1, compute system 100 can also be implemented as two or more compute systems operating together.

In some embodiments, processor subsystem 110 includes one or more processors or processing units configured to execute program instructions to perform functionality described herein. For example, processor subsystem 110 can execute an operating system, a middleware system, one or more applications, or any combination thereof.

In some embodiments, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive eXecutive (AIX), network operating systems (e.g., Microsoft Windows Server), and real-time operating systems (e.g., QNX). In some embodiments, the operating system includes various procedures, sets of instructions, software components, and/or drivers for controlling and managing general system tasks (e.g., memory management, storage device control, power management, or the like) and for facilitating communication between various hardware and software components. In some embodiments, the operating system uses a priority-based scheduler that assigns a priority to different tasks that processor subsystem 110 can execute. In such examples, the priority assigned to a task is used to identify a next task to execute. In some embodiments, the priority-based scheduler identifies a next task to execute when a previous task finishes executing. In some embodiments, the highest priority task runs to completion unless another higher priority task is made ready.

In some embodiments, the middleware system provides one or more services and/or capabilities to applications (e.g., the one or more applications running on processor subsystem 110) outside of what the operating system offers (e.g., data management, application services, messaging, authentication, API management, or the like). In some embodiments, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some embodiments, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some embodiments, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some embodiments, the first node notifies the second node that the data has been stored in the memory by sending a pointer (e.g., a memory pointer, such as an identification of a memory location) to the second node so that the second node can access the data from where the first node stored the data. In some embodiments, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 800, 900, 1000, and 11000 described below.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Compute system 100 can also include other forms of storage such as cache memory in processor subsystem 110 and secondary storage on I/O device 140 (e.g., a hard drive, storage array, etc.). In some embodiments, these other forms of storage can also store program instructions executable by processor subsystem 110 to perform operations described herein. In some embodiments, processor subsystem 110 (or each processor within processor subsystem 110) contains a cache or other form of on-board memory.

I/O interface 130 can be any of various types of interfaces configured to communicate with other devices. In some embodiments, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, display generation component, screen, projector, or the like). In some embodiments, compute system 100 is communicating with a network via a network interface device (e.g., configured to communicate over Wi-Fi, Bluetooth, Ethernet, or the like). In some embodiments, compute system 100 is directly wired to the network.

The other I/O devices (e.g., I/O device 140) optionally include one or more physical input controls (e.g., physical user interface elements), such as physical buttons (e.g., push buttons, rocker buttons, etc.), dials, rotatable input mechanisms (e.g., depressible or non-depressible), slider switches, joysticks, click wheels, and so forth. In some embodiments, input controller(s) are, optionally, coupled to any (or none) of the following: a keyboard, an infrared port, a USB port, and a pointer device such as a mouse. The one or more buttons optionally include an up/down button for volume control of a speaker and/or microphone. The one or more buttons optionally include a push button (e.g., physical button 402 and physical button 404, FIG. 4). The one or more buttons can create and/or provide input as one or more different input patterns. A button can receive a press input (e.g., an actuation of the button) and a release input (e.g., the deactuation (e.g., release) of the button). A button can alternatively receive a press input and a hold input (e.g., a threshold period of time passes before the release input is received) (also referred to herein as a "press and hold input"). In some embodiments, the compute system is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors and/or one or more depth camera sensors), such as for tracking a user's gestures (e.g., hand gestures and/or air gestures) as input. In some embodiments, the one or more input devices are integrated with the compute system. In some embodiments, the one or more input devices are separate from compute system 100. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, I/O device 140 optionally includes a contact/motion module that detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture input (also referred to as a tap input) includes detecting a finger-down event followed by detecting a finger-up (liftoff) event at the same position (or substantially the same position) as the finger-down event (e.g., at the position of an icon). For example, detecting a finger tap and hold gesture input (also referred to as a tap and hold input) includes detecting a finger-down event that continues at the same position (or substantially the same position) as the finger-down event (e.g., at the position of an icon) for at least a threshold period of time. For example, detecting a finger swipe gesture on the touch-sensitive surface includes detecting a finger-down event followed by detecting one or more finger-dragging events, and subsequently followed by detecting a finger-up (liftoff) event. In some embodiments, compute system 100 detects one or more gesture inputs that are directed to and/or interact with a user interface of compute system 100 (e.g., for selecting displayed virtual input controls, such as a virtual user interface element like an icon, a slider, or toggle).

Figure 2:
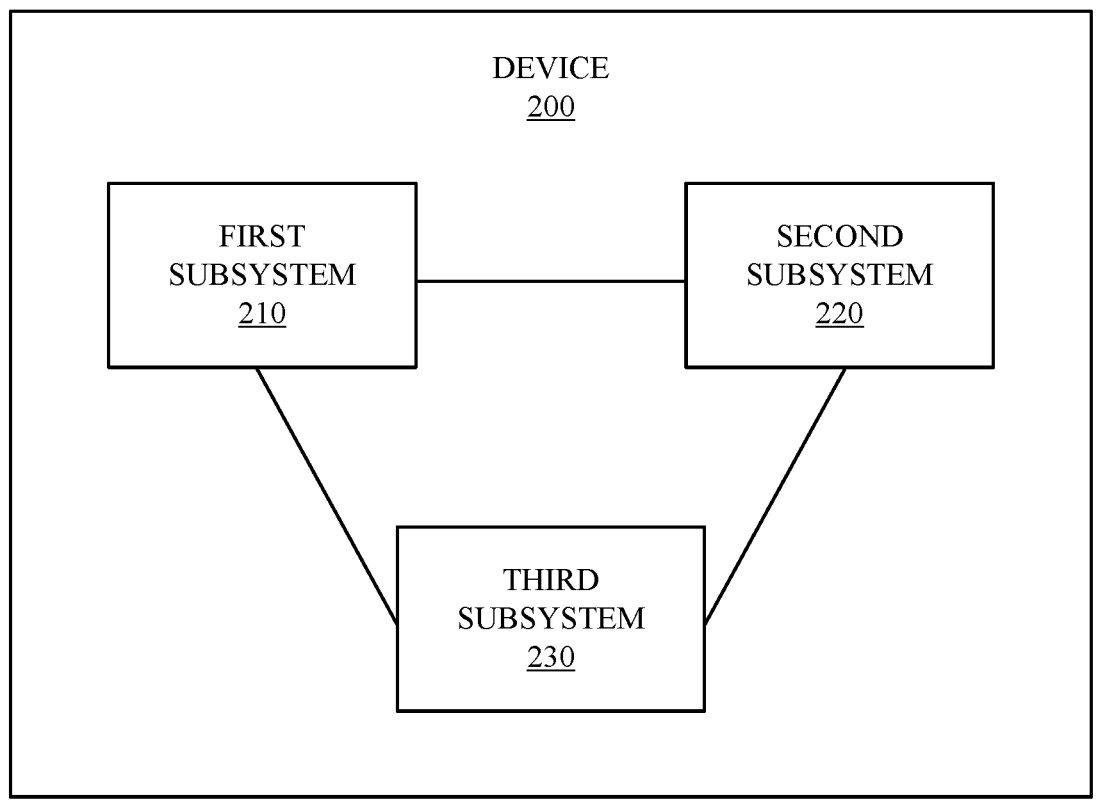
FIG. 2 is a block diagram illustrating a device with interconnected subsystems, in accordance with some embodiments.

FIG. 2 illustrates a block diagram of device 200 with interconnected subsystems. In the illustrated example, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some embodiments, some subsystems are not connected to other subsystem (e.g., first subsystem 210 can be connected to second subsystem 220 and third subsystem 230 but second subsystem 220 cannot be connected to third subsystem 230). In some embodiments, some subsystems are connected via one or more wires while other subsystems are wirelessly connected. In some embodiments, messages are set between the first subsystem 210, second subsystem 220, and third subsystem 230, such that when a respective subsystem sends a message the other subsystems receive the message (e.g., via a wire and/or a bus). In some embodiments, one or more subsystems are wirelessly connected to one or more compute systems outside of device 200, such as a server system. In such examples, the subsystem can be configured to communicate wirelessly to the one or more compute systems outside of device 200.

In some embodiments, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some embodiments, device 200 is configured to navigate (with or without user input) in a physical environment.

In some embodiments, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some embodiments, at least a portion of device 200 functions as a distributed compute system. For example, a task can be split into different portions, where a first portion is executed by first subsystem 210 and a second portion is executed by second subsystem 220.

Attention is now directed towards techniques for communicating data between computer systems. Such techniques are described in the context of applications of a smartphone connecting with a wearable device. It should be recognized that other types of electronic devices can be used with techniques described herein. For example, a controller and/or an accessory can connect with another accessory using techniques described herein. In addition, techniques optionally complement or replace other techniques for connecting computer systems.

Figure 3:
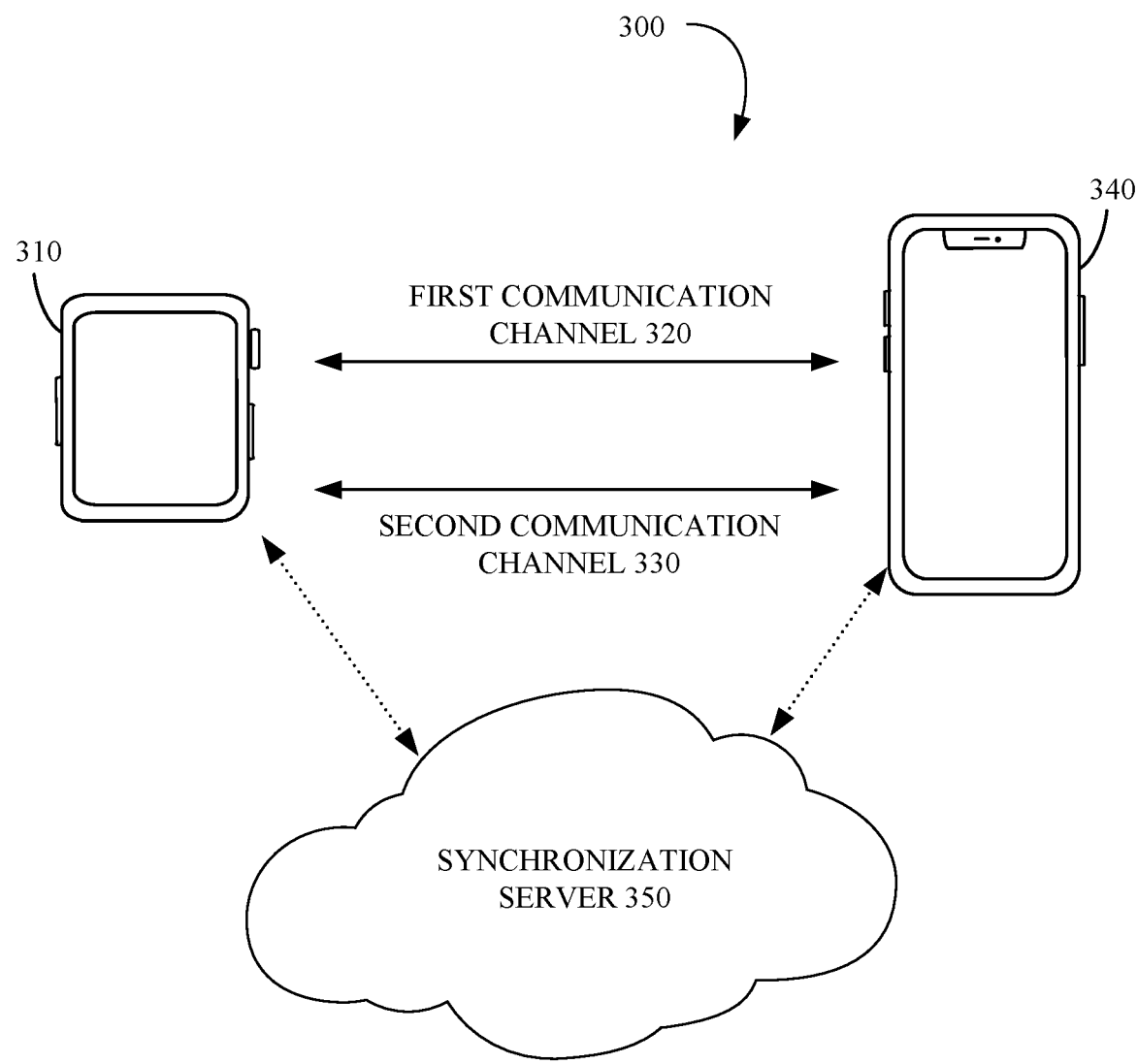
FIG. 3 illustrates an exemplary network diagram that illustrates a relationship between two computer systems and a server, in accordance with some embodiments.

FIG. 3 illustrates exemplary network diagram 300 that illustrates a relationship between two computer systems (e.g., portable multifunction devices) (e.g., smartwatch 310 and smartphone 340) and synchronization server 350, in accordance with some embodiments. As illustrated in FIG. 3, smartwatch 310 is in communication with smartphone 340. Smartwatch 310 and/or smartphone 340 can include one or more of the features described with respect to compute system 100 of FIG. 1 and/or device 200 of FIG. 2. In some embodiments, smartwatch 310 is a wearable device (e.g., a watch) and smartphone 340 is a smartphone, both associated with the same user account (e.g., logged into and/or trusted by the same user account).

As illustrated in FIG. 3, smartwatch 310 and smartphone 340 are connected via first communication channel 320 and second communication channel 330. For example, smartwatch 310 and smartphone 340 communicate (e.g., exchange data and/or messages) over both first communication channel 320 and second communication channel 330 (e.g., send and/or receives messages concurrently through the two channels, in an alternating manner through the two channels, and/or sporadically on each of the two channels as needed). In some embodiments, smartwatch 310 and smartphone 340 communicate via a single communication channel (e.g., first communication channel 320 or second communication channel 330). For example, smartwatch 310 and smartphone 340 can be only connected via first communication channel 320 and communication between smartwatch 310 and smartphone 340 is exchanged over that channel. In some embodiments, the data communicated between smartwatch 310 and the smartphone 340 includes media output data representing media output by smartwatch 310 (e.g., display data representing what is displayed by smartwatch 310). In some embodiments the data communicated between smartwatch 310 and the smartphone 340 includes display data (e.g., data associated with and/or including displayable content (e.g., a user interface), such as display mirroring data, also referred to as "screen mirroring data" herein) displayed on smartwatch 310. In some embodiments, the display data communicated between smartwatch 310 and smartphone 340 includes user interface element data (e.g., virtual and/or physical input controls) of smartwatch 310.

At FIG. 3, smartwatch 310 and smartphone 340 communicate via one or more peer-to-peer ("P2P") network(s). In some embodiments, first communication channel 320 is a P2P network. In some embodiments, second communication channel 330 is a P2P network. For example, a P2P network is a network in which individual nodes in the network share and exchange resources directly with each other without relying on a central server or authority. For example, smartwatch 310 receives and/or sends display data to and/or from smartphone 340 via a P2P network, and similarly smartphone 340 receives and/or sends the display data to and/or from smartwatch 310 via a P2P network.

As illustrated in FIG. 3, one or more of smartwatch 310 and smartphone 340 communicate with synchronization server 350. In some embodiments, synchronization server 350 is a network node (e.g., a Wi-Fi router, and/or connection point), a server, and/or a third computer system (e.g., different from smartwatch 310 and smartphone 340). Synchronization server 350 can include one or more of the features described with respect to compute system 100 of FIG. 1 and/or device 200 of FIG. 2.

In some embodiments, synchronization server 350 assists and/or authorizes a pairing operation between smartwatch 310 and smartphone 340. In some embodiments, synchronization server 350 authenticates that a user account associated with smartwatch 310 is and/or is permitted to be associated with smartphone 340 (e.g., to thereby enable access to data and establish communication).

In some embodiments, synchronization server 350 acts as an intermediary for communicating data between smartwatch 310 and smartphone 340. In some embodiments, synchronization server 350 sends and/or receives data to and/or from smartwatch 310 and/or smartphone 340. For example, smartwatch 310 requests data from smartphone 340 by sending the request for data to synchronization server 350, and synchronization server 350 sends the request to smartphone 340. In some embodiments, synchronization server 350 receives data from smartphone 340 and synchronization server 350 sends the data to smartwatch 310. In some embodiments, synchronization server 350 receives requests to and/or from smartwatch 310 and/or smartphone 340.

In some embodiments, synchronization server 350 does not act as an intermediary for communicating data between smartwatch 310 and smartphone 340. In some embodiments, a request received from smartphone 340 causes smartwatch 310 to send data (e.g., media output data (e.g., display data and/or audio data) and/or information associated with one or more UI elements in the media output data, described in more detail herein) directly to smartphone 340 via first communication channel 320 and/or second communication channel 330. In some embodiments, synchronization server 350 acts as an intermediary for requests between smartwatch 310 and smartphone 340 but does not act as an intermediary for data exchange. For example, smartwatch 310 requests data from smartphone 340 by sending the request for data to synchronization server 350, and synchronization server 350 sends the request to smartphone 340. Smartphone 340 then communicates the requested data to smartwatch 310 via first communication channel 320 and/or second communication channel 330.

In some embodiments, synchronization server 350 provides an authentication credential (e.g., a password and/or network information) to smartphone 340 for use in establishing a connection to smartwatch 310. For example, smartwatch 310 sends a request to establish communication with smartphone 340 to synchronization server 350. Smartwatch 310 sends an authentication credential to join second communication channel 330 to synchronization server 350. Synchronization server 350 sends the authentication credential to smartphone 340, and smartphone 340 uses the authentication credential to join second communication channel 330 (e.g., by providing the credential to smartwatch 310).

In some embodiments, synchronization server 350 is optional. For example, smartwatch 310 and/or smartphone 340 can communicate directly (e.g., for exchanging requests and/or data) without being connected to synchronization server 350 (e.g., at a given time) and/or while connected to synchronization server 350 (e.g., without using synchronization server 350 to exchange requests and/or data).

Figure 4:
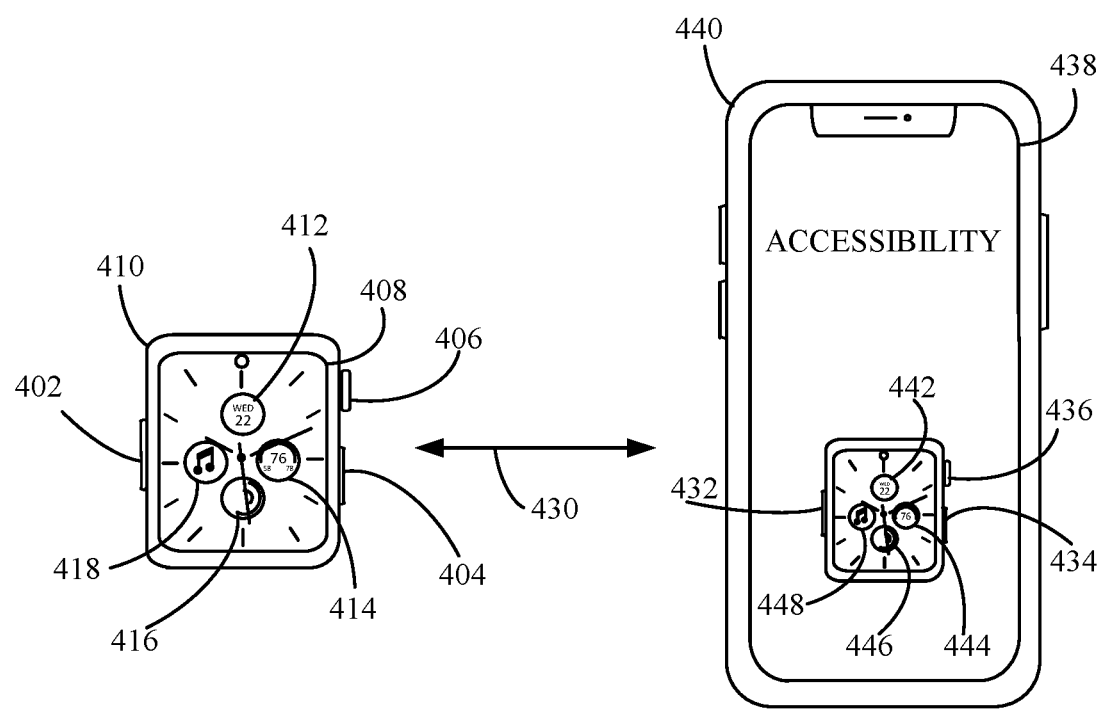
FIG. 4 illustrates exemplary display of user interface elements for two computer systems, in accordance with some embodiments.

FIG. 4 illustrates an exemplary display of user interface elements for two computer systems (e.g., portable multifunction devices, such as smartwatch 410 and smartphone 440), in accordance with some embodiments. FIG. 4 illustrates smartwatch 410 in communication with smartphone 440. Smartwatch 410 and/or smartphone 440 can each include one or more of the features described with respect to compute system 100 of FIG. 1, device 200 of FIG. 2, smartwatch 310 of FIG. 3, and/or smartphone 340 of FIG. 3. For example, smartwatch 410 can correspond to smartwatch 310 and smartphone 440 is can correspond to smartphone 340, both associated with the same user account (e.g., logged into and/or trusted by the same user account).

As illustrated in FIG. 4, smartwatch 410 and smartphone 440 are connected via communication channel 430. In some embodiments, communication channel 430 represents a single communication channel. In some embodiments, communication channel 430 represents multiple communication channels (e.g., first communication channel 320 and second communication channel 330). In some embodiments, smartwatch 410 is paired with smartphone 440 (e.g., via Bluetooth) to exchange data (e.g., notifications, messages, images, calendar data, and/or other data).

As illustrated in FIG. 4, smartwatch 410 includes physical button 402, physical button 404, and rotatable input mechanism 406. In some embodiments, smartwatch 410 includes more, fewer, and/or different input mechanisms. As illustrated in FIG. 4, smartwatch 410 displays a first user interface including user interface elements 412, 414, 416, and 418 on display 408. At FIG. 4, user interface elements 412, 414, 416, and 418 correspond to selectable representations of applications (e.g., which can also be referred to as icons, affordances, controls, and/or complications). User interface element 412 corresponds to a representation of a calendar application. User interface element 414 corresponds to a representation of a weather application. User interface element 416 corresponds to a representation of an activity application. User interface element 418 corresponds to a representation of a music application. In some embodiments, smartwatch 410 displays additional and/or alternative user interface elements.

At FIG. 4, smartwatch 410 communicates, via communication channel 430 to smartphone 440, display data and/or one or more input control data of smartwatch 410.

In some embodiments, an input control is a virtual and/or physical element associated with a user interface (also referred to as a user interface element). For example, each of the user interface elements 412, 414, 416, and 418, physical buttons 402 and 404, and rotatable input mechanism 406 are examples of input controls. In some embodiments, an input associated with (e.g., detected at a location of) an input control, via smartwatch 410, causes smartwatch 410 to perform a corresponding action or function (e.g., one or more processes and/or operations).

In some embodiments, the display data includes screen mirroring data of smartwatch 410. In some embodiments, the input control data includes the input controls including physical elements (e.g., physical buttons 402 and 404, and rotatable input mechanism 406) and virtual UI elements (e.g., user interface elements 412, 414, 416, and 418) of smartwatch 410. In some embodiments, the input control data of smartwatch 410 includes a mapping of input controls. In some embodiments, a mapping describes one or more details of a relationship between one or more input controls, one or more locations within a user interface (e.g., where the input control is located) that is displayed on smartwatch 410, and one or more available actions for the input controls. In some embodiments, the display data includes both the mapping and screen mirroring data of smartwatch 410.

As illustrated in FIG. 4, smartphone 440 displays, via display 438, an accessibility interface. For example, smartphone 440 is used to display a representation of smartwatch 410 on display 438. It should be recognized that smartphone 440 can display other user interfaces that use techniques described herein. As illustrated in FIG. 4, the representation of smartwatch 410 includes representations of input controls of smartwatch 410. In some embodiments, the accessibility interface provides one or more alternative and/or additional functions for a user interface of smartwatch 410. At FIG. 4, smartphone 440 receives, from smartwatch 410 and via communication channel 430, the display data and/or input control data of smartwatch 410. The accessibility interface of smartwatch 410, displayed on smartphone 440, includes representations of physical buttons 432 and 434 (corresponding, respectively, to physical buttons 402 and 404 of smartwatch 410), representation rotatable input mechanism 436 (corresponding to rotatable input mechanism 406 of smartwatch 410), and representation of user interface elements 442, 444, 446, and 448 (corresponding, respectively, to user interface elements 412, 414, 416, and 418 displayed on smartwatch 410).

In some embodiments, smartphone 440 displays display data via display 438. For example, as illustrated in FIG. 4, the accessibility interface displayed by smartphone 440 includes display data of the user interface displayed by smartwatch 410 (e.g., it is mirrored, the same size or a different size (e.g., bigger or smaller)). In some embodiments, smartphone 440 displays the display data simultaneously with the input control data. In some embodiments, display data includes data associated with displayed content that is not an input control (e.g., includes visual information about user interface element 412 and background numerals of the watch face in FIG. 4). In some embodiments, display data does not include data associated with displayed content that is not an input control (e.g., includes visual information about user interface element 412 and does not include information about background numerals of the watch face in FIG. 4).

An accessibility interface and/or an accessibility feature as described herein can provide additional and/or alternative capability for interacting with a user interface (e.g., of smartwatch 410). In some embodiments, smartphone 440 operates as a proxy to accept user input for smartwatch 410, such that input accepted at smartphone 440 causes one or more results on smartwatch 410 as if the input was received via smartwatch 410. For example, an input directed to a selection of user interface element 442 is received on smartphone 440 and, in response, smartphone 440 communicates with smartwatch 410 to perform the corresponding action on smartwatch 410 as if the input was directed to a selection of user interface element 412.

The ability to use a computer system (e.g., smartphone 440) as a proxy can enable the ability to use one or more capabilities of one computer system with a user interface of another computer system. In some embodiments, smartphone 440 is used as a proxy to interact with features and/or applications that are available to (e.g., installed on) smartwatch 410 (e.g., but not available to smartphone 440). For example, smartphone 440 can receive input representing selection of user interface element 446, representing an activity application that is not installed on smartphone 440. Smartphone 440 communicates with smartwatch 410 to perform the corresponding action as if smartwatch 410 received the input on a user interface element of smartwatch 410 and, in response, smartwatch 410 can display a corresponding activity application (e.g., which can be mirrored onto smartphone 440, according to the techniques described herein). The activity application can be interacted with via input at smartphone 440, even though the application is not installed thereon.

In some embodiments, smartphone 440 is used as a proxy to interact with features and/or applications that are not available to (e.g., installed on) smartwatch 410 (e.g., but that are available to smartphone 440). In some embodiments, smartphone 440 provides additional input and/or output options than what is available on smartwatch 410. For example, smartphone 440 can include a screen reader function (e.g., application) to read aloud data (e.g., displayed UI elements) of a user interface, where a screen reader function is not available on smartwatch 410. For another example, smartphone 440 can include a voice input function (e.g., application) that accepts voice input for interacting with (e.g., selecting) data (e.g., a displayed UI element) of a user interface, where voice input is not supported by smartwatch 410.

The ability to use a computer system as a proxy for another computer system in a way that extends capabilities can require the exchange of particular data (e.g., that corresponds to a displayed user interface). In some embodiments, the particular data includes mapping data (also referred to herein as a "mapping"). The mapping data can provide a receiving (e.g., proxy) computer system (e.g., smartphone 440 in FIG. 4) with enough information so that extended features can be used (e.g., text for use by a text-to-speech screen reading function, location information, and/or an action (e.g., one or more acceptable input operations) associated with a UI element (e.g., virtual button) so that the UI element can be interacted with. For example, smartphone 440 receives, from smartwatch 410, via communication channel 430, a mapping for user interface element 412. User interface element 412 is displayed at a first location, and has the actions available of a tap input, and tap and hold input. As illustrated in FIG. 4, smartphone 440 displays user interface element 442 representing user interface element 412 (of smartwatch 410). Smartphone 440 detects a voice input corresponding to a selection of representation of user interface element 442 (e.g., "Select music application icon"). Using the mapping, smartphone 440 determines the input corresponds to the press action, and sends an indication of the press input and/or an indication of an action resulting from the press input via communication channel 430 to smartwatch 410. The result of this example is that the user is able to use a voice command to select an application. As used herein, a "tap input" refers to an input associated with a particular virtual UI element (e.g., displayed on a touch-sensitive surface), and a "press" refers to an input associated with a physical UI element (e.g., a physical, depressible button) (e.g., and not associated with a particular virtual UI element).

Figure 5:
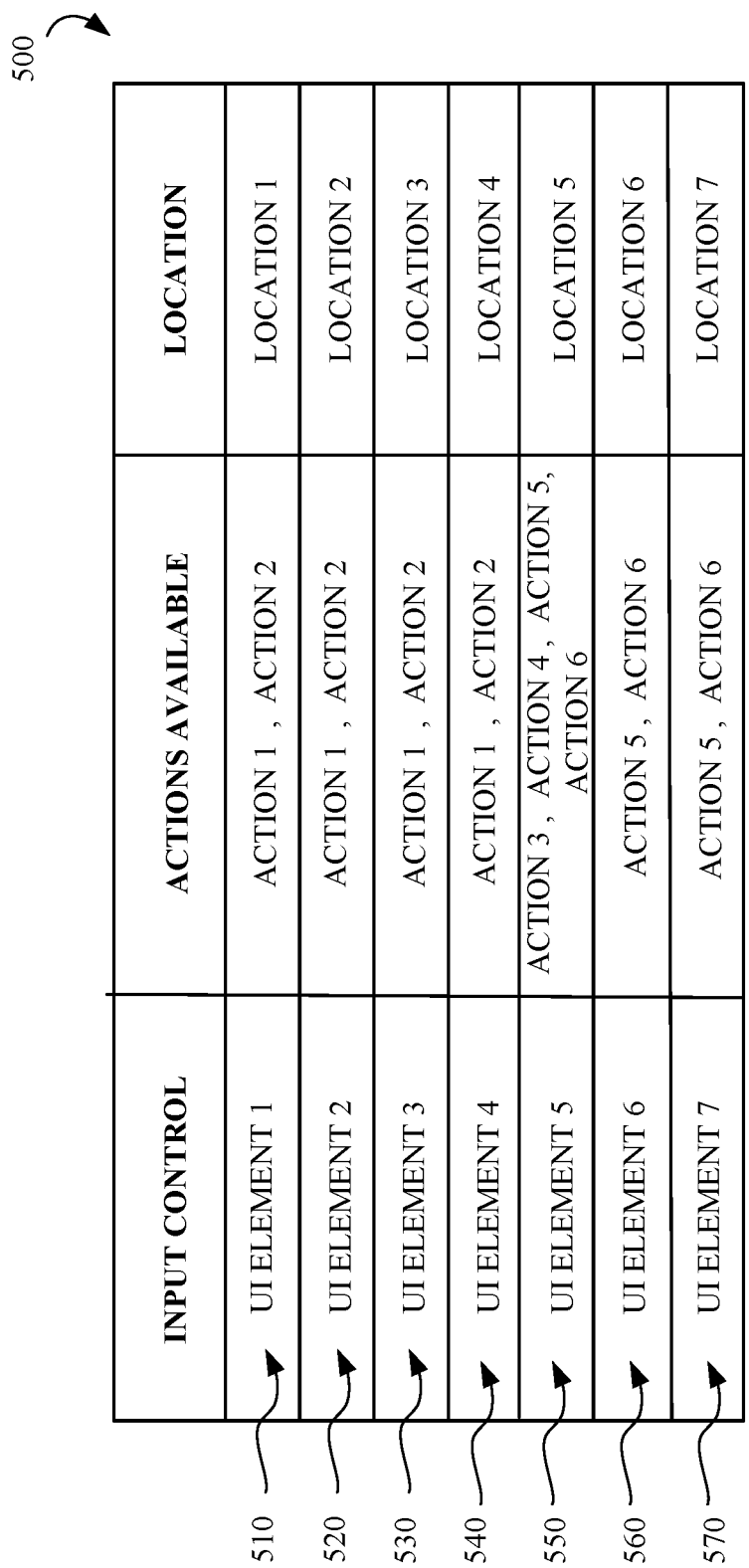
FIG. 5 illustrates a table representing an exemplary mapping, in accordance with some embodiments.

FIG. 5 illustrates table 500 representing an exemplary mapping, in accordance with some embodiments. While the mapping in table 500 is illustrated as including particular data and/or particular arrangements of data, the data included in a mapping is not limited to the example shown in table 500. In some embodiments, a mapping can include additional, less, and/or different data than in FIG. 5. In some embodiments, a mapping is sent from a first computer system (e.g., smartwatch 310, and/or smartwatch 410) to a second computer system (e.g., smartphone 340, and/or smartphone 440). The mapping in table 500 is presented in table form merely as an illustrative tool. In some embodiments, a mapping is stored and/or exchanged in a different format that is appropriate for grouping and/or illustrating relationships between data (e.g., actions available and location for a given UI element).

As illustrated in FIG. 5, the mapping is presented as including three types of information, each in a column. Each row includes an input control, actions available for the indicated input control, and the location associated with the input control. In some embodiments, the mapping location for a row can be empty or otherwise indicate that all or no specific locations apply to the respective input control and/or available action because the actions available (e.g., a rotation) are not associated with a specific location within the corresponding user interface. As illustrated in FIG. 5, the input controls are user interface elements 1 through 7. In some embodiments, each of user interface elements 1 through 7 correspond to each of the input controls of FIG.

4, including user interface elements 412, 414, 416, and 418, and rotatable input mechanism 406, and physical buttons 402 and 404 (respectively).

As illustrated in FIG. 5, the actions available are action 1, action 2, action 3, action 4, action 5, and action 6. As illustrated in FIG. 5, some actions available are the same for some input controls, and some actions available are different. For example, UI element 7 has the same actions available as UI element 6, and UI element 1 has different actions available than UI element 6. In some embodiments, the actions available are an input, operation, and/or input with an operation. For example, an action can correspond to a type of input: action 1 is a tap input, action 2 is a tap and hold input, action 3 is a rotation down input, action 4 is a rotation up input, action 5 is a press input, and/or action 6 is a press and hold input. For example, an action can correspond to an operation that results from input associated with a UI element: action 1 represents an operation to launch the corresponding application of the user interface element, action 2 represents an operation to launch a settings menu for the corresponding user interface element, action 3 represents an operation to scroll down the displayed content, action 4 represents an operation to scroll up the displayed content, action 5 represents an operation to display a third user interface, and action 6 represents an operation to display a fourth user interface. In some embodiments, additional and/or alternative actions are available for each input control.

As illustrated in FIG. 5, locations associated with each input control are listed. In some embodiments, the location is the position of the input control with respect to a user interface (e.g., with which it is displayed) and/or a display component (e.g., on which it is displayed). For example, the location is a set of one or more coordinates of a user interface element (e.g., user interface elements 412, 414, 416, and 418), and/or a position of a physical input (e.g., physical buttons 432 and 434 and/or rotatable input mechanism 436) of a respective computer system. In some embodiments, the coordinates define boundaries of the user interface element (e.g., the size and/or dimensions of the user interface element). In some embodiments the location defines the shape of the user interface element. In some embodiments the location includes the orientation of the respective computer system.

As illustrated in FIG. 5, row 510 includes UI element 1 at location 1, and action 1 and action 2 as available actions. Row 520 includes UI element 2 at location 2, and action 1 and action 2 as available actions. Row 530 includes UI element 3 at location 3, and action 1 and action 2 as available actions. Row 540 includes UI element 4 at location 4, and action 1 and action 2 as available actions. Row 550 includes: UI element 5 at location 5; and action 3, action 4, action 5, and action 6 as available actions. Row 560 includes UI element 6 at location 6; and action 5, and action 6 as available actions. Row 570 includes UI element 7 at location 7, and action 5 and action 6 as available actions.

In some embodiments, each of UI elements 1 through 7, from FIG. 5, correspond to input controls illustrated in FIG. 4. For example, UI element 1 is user interface element 412 in FIG. 4 corresponding to the representation of the calendar application. UI element 1 is associated with action 1 and action 2, where action 1 is a tap input, and action 2 is a tap and hold input. In some embodiments, UI element 1 is associated with action 1 and action 2, where action 1 is the operation of launching the associated application (e.g., calendar application), and action 2 is the operation of launching a settings menu for the associated application. The location of UI element 1 is location 1, corresponding to the top middle UI element of the first user interface displayed via a display (e.g., display 408) on smartwatch 410. As another example, UI element 2 is user interface element 414 in FIG. 4 corresponding to the representation of the weather application. UI element 2 is associated with action 1 and action 2, where action 1 is a tap input, and action 2 is a tap and hold input. In some embodiments, UI element 2 is associated with action 1 and action 2, where action 1 is the operation of launching the associated application (e.g., music application), and action 2 is the operation of launching a settings menu for the associated application. The location of UI element 2 is location 2, corresponding to the right middle UI element of the first user interface displayed via display 408 on smartwatch 410. For example, UI element 3 is user interface element 416 in FIG. 4 corresponding to the representation of the activity application. UI element 3 is associated with action 1 and action 2, where action 1 is a tap input, and action 2 is a tap and hold input. In some embodiments, UI element 1 is associated with action 1 and action 2, where action 1 is the operation of launching the associated application (e.g., activity application), and action 2 is the operation of launching a settings menu for the associated application. The location of UI element 3 is location 3, corresponding to the bottom middle UI element of the first user interface displayed via a display (e.g., display 408) on smartwatch 410. For example, UI element 4 is user interface element 418 in FIG. 4 corresponding to the representation of the music application. UI element 4 is associated with action 1 and action 2, where action 1 is a tap input, and action 2 is a tap and hold input. In some embodiments, UI element 1 is associated with action 1 and action 2, where action 1 is the operation of launching the associated application (e.g., music application), and action 2 is the operation of launching a settings menu for the associated application. The location of UI element 4 is location 4, corresponding to the left middle UI element of the first user interface displayed via a display (e.g., display 408) on smartwatch 410. In yet another example, UI element 5 is rotatable input mechanism 406 in FIG. 4. UI element 5 is associated with action 3, action 4, action 5, and action 6 wherein action 3 is a rotation down input; action 4 is a rotation up input; action 5 is a press input, action 6 is a press and hold input. In some embodiments, UI element 5 is associated with action 3, action 4, action 5, and action 6, where action 3 is the operation of scrolling down the user interface to display additional content, action 4 is the operation of scrolling up the user interface to display additional content, action 5 is the operation of displaying a third user interface, and action 6 is the operation of displaying a fourth user interface. The location of UI element 6 is on the top right of smartwatch 410. For example, UI element 6 is physical button 402 in FIG. 4. UI element 6 is associated with action 5 and action 6, where action 5 is a press input, and action 6 is a press and hold input. In some embodiments, UI element 6 is associated with action 5 and action 6, where action 5 is the operation of displaying a third user interface, and action 6 is the operation of displaying a fourth user interface. The location of UI element 6 is location 6, corresponding to the left most physical button of smartwatch 410. For example, UI element 7 is physical button 404 in FIG. 4. UI element 6 is associated with action 5 and action 6, where action 5 is a press input, and action 6 is a press and hold input. In some embodiments, UI element 7 is associated with action 5 and action 6, where action 5 is the operation of displaying a third user interface, and action 6 is the operation of displaying a fourth user interface. The location of UI element 7 is location 7, corresponding to the right most physical button of smartwatch 410.

Figure 6:
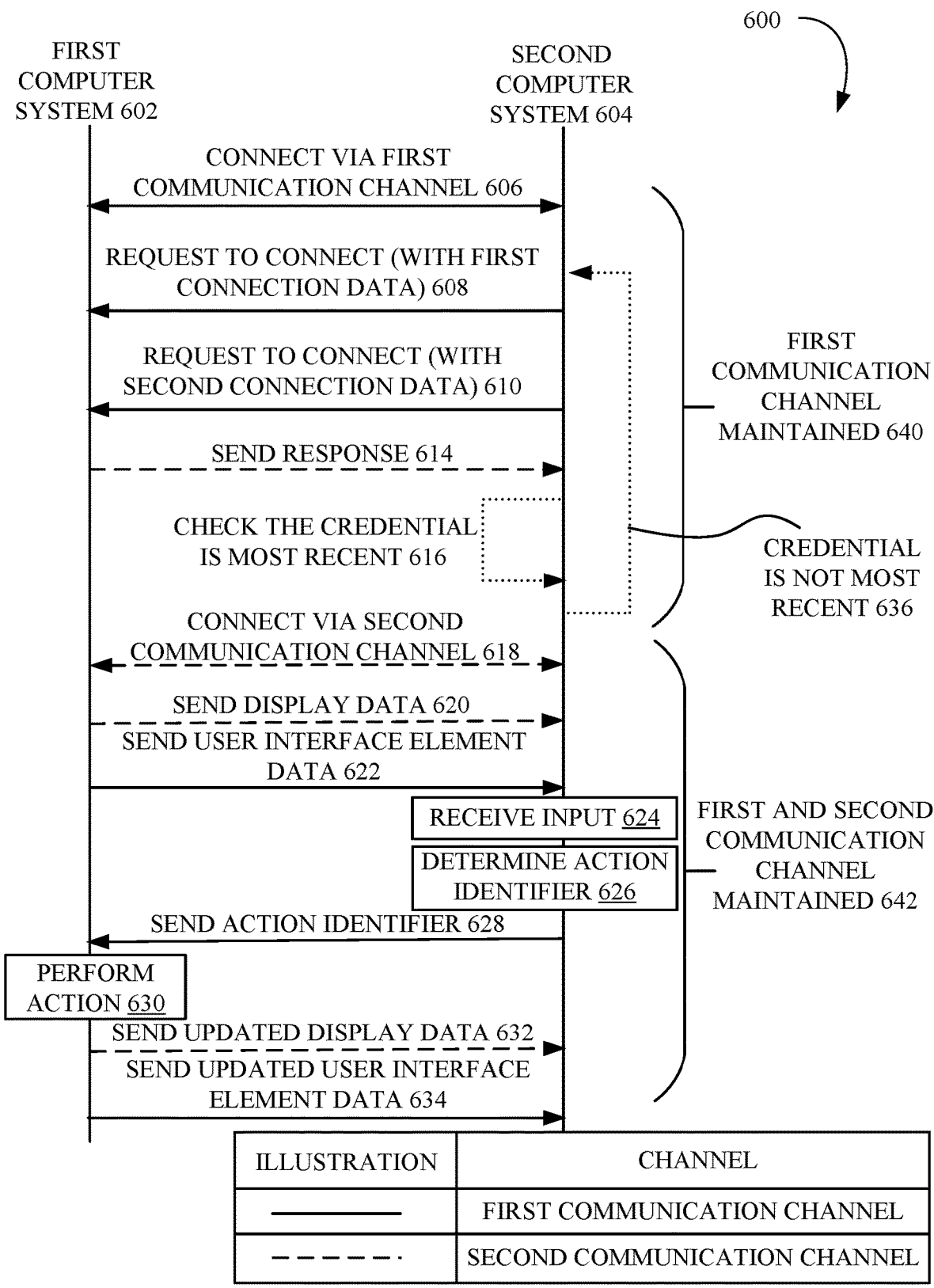
FIG. 6 illustrates an exemplary communication diagram for two computer systems, in accordance some embodiments.

FIG. 6 illustrates an exemplary communication diagram for two computer systems (e.g., portable multifunction devices, such as a smartwatch and a smartphone), in accordance some embodiments. As illustrated in FIG. 6, diagram 600 includes first computer system 602 in communication with second computer system 604. First computer system 602 and/or second computer system 604 can include one or more of the features described with respect to: compute system 100 of FIG. 1, device 200 of FIG. 2, smartwatch 310 of FIG. 3, smartwatch 410 of FIG. 4, smartphone 340 of FIG. 3, and/or smartphone 440 of FIG. 4. For example, first computer system 602 can be a wearable device (e.g., a watch) and second computer system 604 can be a smartphone, both associated with the same user account (e.g., logged into and/or trusted by the same user account).

At 606, first computer system 602 and second computer system 604 connect via a first communication channel (e.g., first communication channel 320 and/or second communication channel 430). For example, first computer system 602 and second computer system 604 connect via a first communication channel in response to user input received at one or more of the respective computer systems (e.g., as part of a pairing operation). In some embodiments, the first communication channel is established by a pairing between first computer system 602 and second computer system 604. For example, both first computer system 602 and second computer system 604 can be paired by associating each with the same user account (e.g., logged into and/or trusted by the same user account). In some embodiments, while first computer system 602 and second computer system 604 are connected via the first communication channel, second computer system 604 receives a request to connect with first connection data.

At 608, second computer system 604 sends a request to connect with (e.g., including) the first connection data to first computer system 602 via the first communication channel. For example, in response to receiving an input that corresponds to a selection of a user interface object, second computer system 604 sends the request to connect with the first connection data to first computer system 602 at 608. In some embodiments, the first connection data includes network information and/or a credential that can be used to connect to a second communication channel. In some embodiments, the request to connect includes a request to connect via the second communication channel. For example, the request to connect is a request to join the second communication channel using the first connection data. In some embodiments, the request to connect includes a request to send display data of first computer system 602 to second computer system 604 via the second communication channel (e.g., at block 620 described below). For example, the request to connect includes instructions to send display data of first computer system 602 via the second communication channel in response to connecting via the second communication channel with second computer system 604. In some embodiments, second computer system 604 optionally continues to send additional requests such as at 610 where second computer system 604 sends a request to connect with second connection data, via the first communication channel. In some embodiments, the connection data is different between the first connection data and the second connection data. In some embodiments, the additional requests (such as and/or similar to as described at 608 and/or 610) are automatically sent (e.g., via a communication channel such as the first communication channel) if a valid response is not received at 614 within a threshold time.

In some embodiments, first computer system 602 receives the request to connect at 608 and any additional requests (such as at 610) and, in response to receiving the request, attempts to connect with second computer system 604 via the second communication channel by sending a response at 614. In some embodiments, first computer system 602 attempts to connect subsequent to (e.g., in conjunction with receiving, and/or in response to receiving) each request and/or automatically based on each request. At 614, first computer system 602 sends a response to second computer system 604 via the second communication channel. In some embodiments, the response includes the first connection data received at 608. In some embodiments, if multiple instances of connection data were sent (e.g., in requests) by second computer system 604 to first computer system 602, first computer system 602 sends the most recent connection data in the response (e.g., a credential issued prior in time is expired if a subsequent credential has been issued). For example, if second computer system 604 sent request to connect (with first connection data) 608, and request to connect (with second connection data) 610 to first computer system 602, first computer system 602 sends the second connection data in a response at 614.

At 616, second computer system 604 optionally checks the received credential is valid (e.g., most recent) at 636. In some embodiments, second computer system 604 checks the received credential is valid in response to receiving the response at 614. In some embodiments, if second computer system 604 determines the credential is not valid (e.g., is not most recent) at 636, second computer system 604 returns to 608 and sends connection data. In some embodiments, when second computer system 604 returns to 608, the connection data is the same as the first connection data previously sent to first computer system 602. In some embodiments, when second computer system 604 returns to sending the connection data at 608, the connection data is different from when second computer system 604 first sends the first connection data at 608. In some embodiments, the process of second computer system 604 sending additional requests to connect (e.g., at 610) includes different connection data from the connection data previously sent to first computer system 602 (e.g., includes third connection data different from the first and second connection data). In some embodiments, second computer system 604 continues to send connection data and check the credential is most recent until, at 616, second computer system 604 determines the credential is most recent and/or a cease condition is satisfied (e.g., time or number of tries elapses). As illustrated by 640, each of 606, 608, 610, 614, 616, and 636 occur while the first communication channel is maintained.

At 618, in response to first computer system 602 receiving a valid (e.g., most recent) credential, second computer system 604 and first computer system 602 connect via the second communication channel. In some embodiments, second computer system 604 and first computer system 602 connect via the second communication channel at 618 while the first communication channel is maintained. In some embodiments, the response sent at 614 includes one or more communications (e.g., messages, packets, data, and/or frames) associated with connecting (e.g., forming a connection, establishing a connection, and/or verifying a connection) via the second communication channel at 618. For example, the connection data received at 608 and/or additional requests from second computer system 604 cause first computer system 602 to attempt to connect and/or successfully connect to the second computer system 604 in response to receiving the request(s). In some embodiments, subsequent to first computer system 602 connecting with second computer system 604 via the second communication channel, first computer system 602 sends display data 620 and/or user interface element data at 622.

At 620, first computer system 602 sends display data 620 to second computer system 604, via the second communication channel. At 622, first computer system 602 sends user interface element data (described herein) to second computer system 604, via the first communication channel. In some embodiments, 620 and 622 occur simultaneously and/or in the opposite order than described. In some embodiments, sending display data at 620 includes sending screen mirroring data. In some embodiments, sending user interface element data at 622 includes mapping data (e.g., or a portion thereof) for the input controls at FIG. 4, and/or the exemplary mapping at FIG. 5, via the first communication channel. For example, first computer system 602 sends input controls such as a representation of user interface element 412 and rotatable input mechanism 406, as described above with respect to FIG. 4. In another example, first computer system 602 sends exemplary mapping of UI element 1 illustrated at row 510 and UI element 6 illustrated at row 560. In some embodiments, in response to and/or after receiving the display data and/or the user interface element data, second computer system 604 displays the display data and/or user interface element data received at 620 and 622 from first computer system 602. In some embodiments, second computer system 604 receives an input directed to the displayed user interface element data at 624.

In some embodiments, sending display data at 620 includes sending audio data from first computer system 602 via the second communication channel. In some embodiments, audio data is a digital representation of sound signals, generated or processed by first computer system 602. For example, the audio data sent from the first computer system 602 corresponds to the display data sent at block 620. As another example, the audio data sent from the first computer system 602 is representative of sound signals output by first computer system 602. In some embodiments, first computer system 602 sends audio data while first computer system 602 sends display data (e.g., in conjunction with, together with, and/or at the same time). In some embodiments, first computer system 602 sends audio data before and/or after first computer system 602 sends display data.

At 624, second computer system 604 receives input that corresponds to a user interface element for which corresponding data was received at 622. For example, second computer system 604 receives an input (e.g., selection of the display data displayed on a touchscreen interface) associated with (e.g., at a location of) the user interface element. In some embodiments, an input (e.g., at 624) received by a computer system (e.g., second computer system 604) is an input detected via a component in communication with the computer system. For example, the input received can be a touch input (e.g., a tap, gesture, and/or selection) received via an input device that is a touch-sensitive surface in communication with (e.g., that is part of and/or that is connected to) the computer system (e.g., second computer system 604). In some embodiments, an input (e.g., at 624) received by a computer system (e.g., second computer system 604) is an input received from another computer system (e.g., synchronization server 350) different from the computer system (e.g., different from second computer system 604). For example, a third computer system (e.g., different from the first computer system and/or the second computer system) can detect the input and communicate the input and/or a representation thereof to second computer system 604, wherein receiving such communication corresponds to receiving the input.

In some embodiments, the input received at 624 corresponds to an action available for the user input element as indicated in the mapping received at 622. In one example, the input at 624 is an input at UI element 1 of row 510 in FIG. 5. In such an example, UI element 1 corresponds to user interface element 442. The actions available are a tap input and/or a tap and hold input. In some embodiments, the input received is a touch input. In some embodiments, the input received is a different type than the actions available. For example, the input received is a voice input representing a request to tap input on UI element 1 and second computer system 604 determines the voice input corresponds to the action available of a tap input on UI element 1. In another example, the input at 624 is an input corresponding to selection of UI element 5 represented by row 560 in FIG. 5, for which the actions available are a rotation up input, a rotation down input, a press input, and a press and hold input. In such an example, UI element 5 corresponds to representation of rotatable input mechanism 436. The input received is a rotation up input on the representation of the rotatable input mechanism 436, corresponding to a rotation of a (e.g., physical) rotatable input mechanism 406 (e.g., in a direction toward top of the displayed UI when viewing the display). In some embodiments, in response to receiving the input at 624, second computer system 604 determines the action identifier at 626.

At 626, second computer system 604 determines the action identifier that corresponds to the input received at 624. In some embodiments, second computer system 604 determines the action identifier using a mapping received by first computer system 602.

In some embodiments, the action identifier is an identifier of an action that is associated with (e.g., available for and/or corresponding to) a user interface element (e.g., or a user interface). In some embodiments, an action identifier is any data appropriate to represent an action. For example, an action identifier can be a string, value, number, character, and/or variable. For example, when second computer system 604 sends the action identifier to first computer system 602 at 628, the action identifier that second computer system 604 sends is a value and/or string. In some embodiments, an action identifier identifies a type of input (e.g., and an identifier of which UI element the input applies to). For example, a tap input has an identifier represented in a communication between computer systems as "tap input". In some embodiments, an action identifier identifies a type of input for a specific UI element (e.g., so the identifier for which UI the tap corresponds to does not need to be sent). For example, a tap input has an identifier of "tap_input_21" where there are at least 21 different tap inputs available for a given UI and where each action identifier for the tap inputs maps to different respective UI elements.

For example, referring back to FIG. 4, a tap input on a representation of user interface element 442 corresponds to a tap input on user interface element 412 on smartwatch 410. The action identifier in this example indicates a tap input on user interface element 412. For example, referring back to FIG. 4, a rotation down input on representation of rotatable input mechanism 436 corresponds to the input of a rotation down of rotatable input mechanism 406. The action identifier in this example indicates a rotation down input.

In some embodiments, the action identifier is an identifier of an input and an operation to be performed on first computer system 602. For example, referring back to FIG. 4, a tap input on a representation of user interface element 442 corresponds to an operation of launching the calendar application on smartwatch 410. The action identifier in this example identifies a tap input on user interface element 442 and an operation to launch the calendar application. For example, referring back to FIG. 4, an input to rotate representation of rotatable input mechanism 436 has the corresponding operation of scrolling content down on the first user interface. The action identifier in this example indicates an operation to scroll the content down. In some embodiments, in response to determining the action identifier at 626, second computer system 604 sends an action identifier.

At 628, second computer system 604 sends the action identifier to first computer system 602 via the first communication channel. In some embodiments, in response to receiving the action identifier at 628, first computer system 602 performs the action at 630. At 630, first computer system 602 performs the action (e.g., an input and/or an operation) indicated by the received action identifier. In some embodiments, the action corresponds to the action identifier communicated from second computer system 604. For example, the action identifier received by first computer system 602 identifies a tap input on user interface element 412 (represented by representation of user interface element 442 of FIG. 4) which corresponds to the operation of launching the calendar application as if an input was directly received on user interface element 412. For example, the action identifier, received by first computer system 602, can identify the operation of launching the calendar application. At 630, the corresponding action is to launch the calendar application. In another example, the action identifier, received by the first computer system 602, is a rotation down input of the rotatable input mechanism 406 (e.g., because rotatable input mechanism 436 is a virtual representation of rotatable input mechanism 406, a physical rotation down of rotatable input mechanism 406 can correspond to a rotation down input on 436, a physical rotation up of rotatable input mechanism 406 can correspond to a rotation up input on 436, and a press (e.g., where rotatable input mechanism 406 is depressible) can be a tap input on 436). The corresponding action is to scroll down the content as if the rotatable input mechanism 406 was directly rotated (e.g., a rotation input is registered without the rotatable input mechanism being physically rotated-rather, the action identifier serves as a replacement for the physical rotation for causing the same or similar action to occur). For example, the action identifier received by first computer system 602, identifies the operation of scrolling content down on the first user interface. The corresponding action is to scroll the content down on the first user interface.

In some embodiments, performing the action updates the display of first computer system 602. For example, launching (e.g., due to a received action identifying an operation and/or receiving an input associated a calendar UI element) the calendar application associated with user interface element 412 in FIG. 4 replaces the first user interface with a second user interface representative of the calendar application. In another example, scrolling the content on the display as if rotatable input mechanism 406 was rotated causes additional information to be displayed by scrolling the content on the user interface if the user interface is scrollable. For example, if the second user interface is a displayed representation of the calendar application, a rotation down input associated with rotatable input mechanism 406 (e.g., registered as an input in response to a rotation down on UI element 436) causes first computer system 602 to display additional calendar events than prior to scrolling down. In some embodiments, subsequent to performing the action at 630 and/or updating the display at first computer system 602, first computer system 602 sends updated display data at 632 and/or updated user interface element data at 634.

At 632, first computer system 602 sends updated display data to second computer system 604 via the second communication channel. For example, with reference to FIG. 4, sending updated display data at 632 includes sending updated screen mirroring data from the second user interface when the calendar application is launched. For example, subsequent to launching the calendar application, display data that includes visual representations of a user interface and UI elements of the landing page of the calendar application are sent. Such UI elements can include boxes representing calendar events, dates, days of the week, months, and/or years. In some embodiments, the updated screen mirroring data includes sending only display data that changed and/or is updated from the previously sent display data at 620. For example, if the input results in a rotation down operation where some previously displayed UI elements are still visible, but a new UI element is now displayed, then only data for the new UI element can be sent. In some embodiments, sending updated display data includes sending all the display data for a user interface (even if some of the display data changed and/or is updated). In some embodiments, in response to receiving the updated display data by second computer system 604 at 632, second computer system 604 displays the updated display data on second computer system 604. In some embodiments, second computer system 604 ceases display of display data received at 620 and instead displays display data received at 632.

In some embodiments, sending updated display data at 632 includes sending updated audio data from first computer system 602 via the second communication channel. In some embodiments, the updated audio data includes the same, subsequent, additional, and/or alternative audio signals than the audio data described above at 620.

At 634, first computer system 602 sends updated user interface element data via the first communication channel. For example, with reference to FIG. 4, sending updated user interface element data includes sending a new set of user interface elements (e.g., and associated data and/or mappings associated therewith) from the second user interface when the calendar application is launched. In some embodiments, sending updated user interface element data includes sending only user interface element data that changed and/or is updated from the previously sent user interface element data at 622. In some embodiments, sending updated user interface element data includes sending all the user interface element data for a user interface (e.g., even if only some of the user interface element data changed and/or is updated). In some embodiments, the updated user interface element data is displayed by first computer system 602. In some embodiments, the updated user interface element data is a result of performing the action at 630. In some embodiments, in response to receiving the updated user interface element data by second computer system 604 at 634, second computer system 604 displays the updated user interface element data on second computer system 604. In some embodiments, second computer system 604 ceases display of user interface element data received at 622 and instead displays updated user interface element data received at 632.

As illustrated by 642, the first and second communication channel are maintained at each of 618, 620, 622, 624, 626, 628, 630, 632, and 634. For example, as illustrated in FIG.

6, both the first communication channel and second communication channel are used to exchange data between the first and second computer systems. In some embodiments, certain data is exchanged over the first communication channel and different data is exchanged over the second communication channel. It should be recognized that the first and/or second communication channel, in some embodiments, is not maintained at each of 618, 620, 622, 624, 626, 628, 630, 632, and 634, such as when a communication channel is not in use.

Using different communication channels for different data, as described herein, provides responsive interaction to a user. For example, transmitting data via the first communication channel and the second communication channel in FIG. 6 enables data to be transmitted at least partially simultaneously and/or in an alternating manner via both channels. This can allow data to be transferred between devices more effectively because no one channel transmits all data. For example, the first communication channel transmits user interface element data, and the second communication channel transmits display data. In some embodiments, a communication channel optimized for exchanging data with certain characteristics (e.g., display data). For example, the second communication channel can use a connection and/or protocol with extremely low latency that is more appropriate for exchanging real time display data (which can require a large amount of bandwidth). The result is a responsive user interface experience for a user. For example, received user input 624 can be quickly transmitted to first computer system 602, resulting in updated display data and updated user interface element data quickly transferred to second computer system 604.

Figure 7:
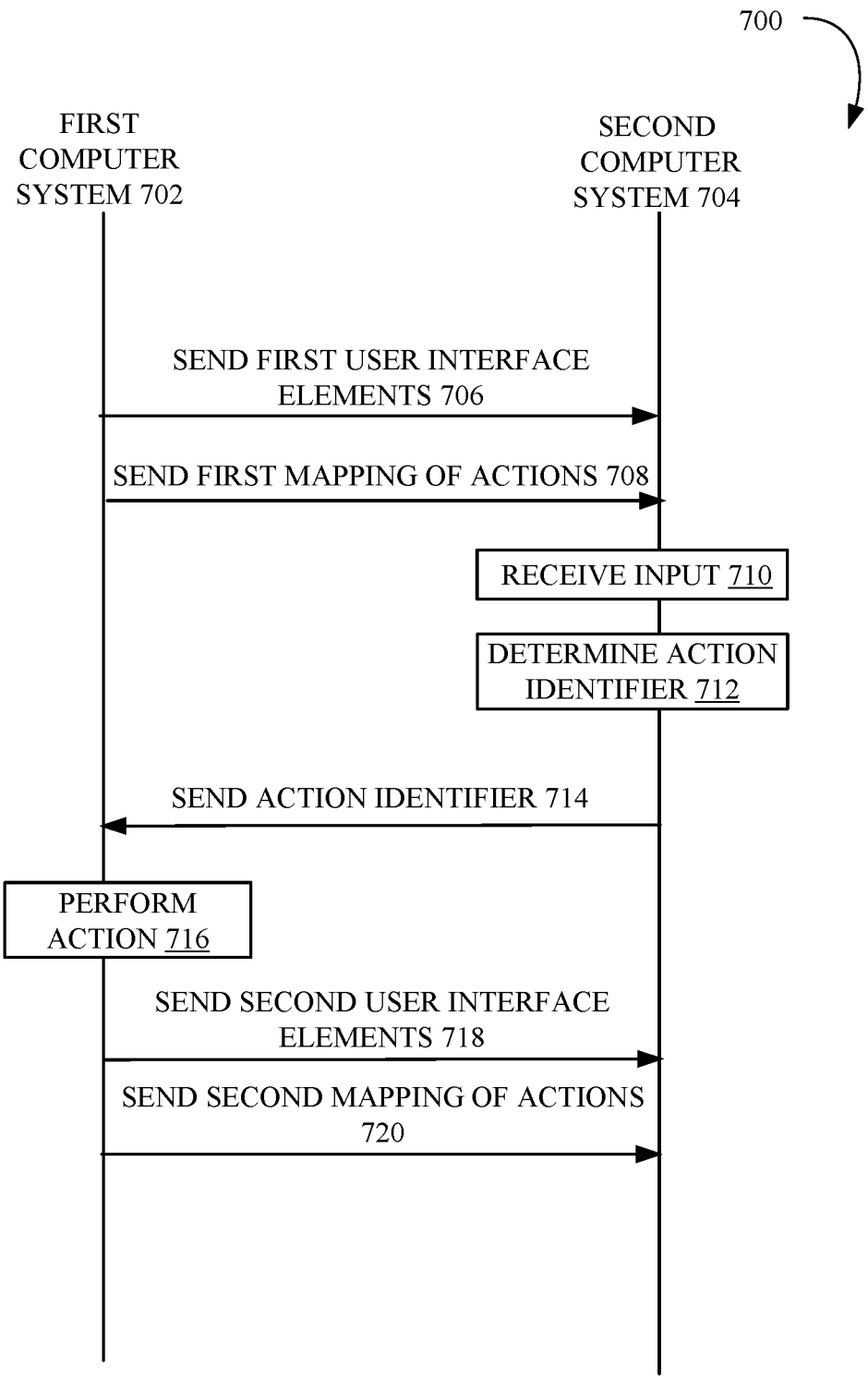
FIG. 7 illustrates an exemplary communication diagram for two computer systems, in accordance some embodiments.

FIG. 7 illustrates an exemplary communication diagram between two computer systems (e.g., portable multifunction devices, such as a smartwatch and a smartphone), in accordance some embodiments. As illustrated in FIG. 7, diagram 700 includes first computer system 702 in communication with second computer system 704. First computer system 702 and/or second computer system 704 can include one or more of the features described with respect to: compute system 100 of FIG. 1, device 200 of FIG. 2, smartwatch 310 of FIG. 3, smartwatch 410 of FIG. 4, first computer system 602 of FIG. 6, smartphone 340 of FIG. 3, smartphone 440 of FIG. 4, and/or second computer system 604 of FIG. 6. For example, first computer system 702 can be a wearable device (e.g., a watch) and second computer system 704 can be a smartphone, both associated with the same user account (e.g., logged into and/or trusted by the same user account).

At 706, first computer system 702 sends first user interface elements to second computer system 704. In some embodiments, sending the first user interface elements includes sending input controls such as described in FIGS. 4, 5, and 6. For example, sending the first user interface elements can include sending data representing user interface element 414 and/or data representing physical button 404 of FIG. 4. In some embodiments, first computer system 702 receives a request to send user interface elements at 706, and in response sends the first user data elements. In some embodiments, first computer system 702 receives and/or detects the request from second computer system 704. For example, first computer system 702 receives the request via a request to connect from second computer system 704 (e.g., similar to the request to connect between first computer system 602 and second computer system 604 at 608 and/or 610 of FIG. 6).

In some embodiments, in response to receiving the first user interface elements at 706, second computer system 704 displays the first user interface elements.

At 708, first computer system 702 sends a first mapping of actions. In some embodiments, sending the first mapping of actions includes sending a mapping such as that shown in table 500 of FIG. 5. For example, sending the first mapping of actions can include sending the mapping of UI element 2 of row 520 and/or UI element 7 of row 570 in FIG. 5. In some embodiments, first computer system 702 receives a request to send a first mapping of actions at 708, and in response sends the first mapping of actions. In some embodiments, first computer system 702 receives a request (e.g., one or more request) to send user interface elements at 706 and/or first mapping of actions at 708, and in response sends the first user interface elements and/or the first mapping of actions. In some embodiments, first computer system 702 receives and/or detects the request from second computer system 704. For example, first computer system 702 receives the request via a request to connect from second computer system 704 (e.g., the request to connect between first computer system 602 and second computer system 604 at 608 and/or 610). In some embodiments, subsequent to receiving the first mapping of actions at 708, second computer system displays the first user interface elements, which can be interacted with (e.g., via received input).

At 710, second computer system 704 receives an input. In some embodiments, the input is a touch input (e.g., a tap, gesture, and/or selection). In some embodiments, the input received at 710 is an input received by second computer system 704. For example, the input received is a touch input (e.g., a tap, gesture, and/or selection) received on a touch-sensitive surface of second computer system 704. In some embodiments, the input received at 710 is an input received by an auxiliary computer system. In some embodiments, second computer system 704 receives the input at a location associated with a user interface element (e.g., identified in the data received from first computer system 702 at 706) (e.g., displayed on second computer system 704). In some embodiments, the input received at 710 corresponds to an action available from the exemplary mapping of FIG. 5. For example, the input received at 710 can be an input at UI element 2 of row 520 in FIG. 5. In such an example, the actions available are a tap input and/or a tap and hold input for UI element 2. In some embodiments, the input received is a tap input.

In some embodiments, the input received by second computer system 704 is a different type than the actions available. For example, the input received can be a voice input to provide (e.g., that represents a request to register) a tap input on the UI element 2. In such an example, second computer system 604 determines (e.g., at 712 described below) that the voice input corresponds to tap input on the UI element 2 and, as a result, determines that the voice input corresponds to the action available of a tap input on UI element 2. In some embodiments, in response to receiving the input at 710, second computer system 704 determines the action identifier at 712.

At 712, second computer system 704 determines the action identifier. In some embodiments, second computer system 704 determines the action identifier by associating the received input with an action identifier received from the mapping at 708. In some embodiments, the action identifier corresponds to the input received at 710 (e.g., a tap). In some embodiments, the action identifier is an operation to be performed on first computer system 702 (e.g., launch an application). For example, if the input received at 710 corresponds to a tap input at UI element 2 of row 520 in FIG. 5, the action identifier is the input and/or the operation. As another example, where the action identifier is an identifier of an input, the action identifier identifies the input of providing a tap at UI element 2. With regard to FIG. 4, if UI element 2 is user interface element 444 on smartphone 440 and 414 on smartwatch 410, the action identifier is providing the tap at user interface element 414 on smartwatch 410. As a third example, where the action identifier is an identifier of an operation, the action identifier identifies the operation corresponding to the tap input 2. As a result of the input received at user interface element 444 corresponding to a tap at UI element 2, the operation is the corresponding operation to the tap at UI element 2 in FIG. 5. With regard to FIG. 4, if UI element 2 is user interface element 444 on smartphone 440 and user interface element 414 on smartwatch 410, the action identifier of the tap input is the operation of launching a weather application. In some embodiments, in response to determining the action identifier at 712, second computer system 704 sends the action identifier to first computer system 702 at 714.

At 714, second computer system 704 sends the action identifier to first computer system 702. In some embodiments, sending the action identifier includes second computer system 704 sending a user interface element corresponding to the action identifier. For example, second computer system 704 determined at 712 the input received at 710 corresponded to a press of UI element 5 of table 500. In this example, second computer system 704 sends the action identifier of the press and at least an indication of UI element 5 to first computer system 702. In some embodiments, in response to receiving the action identifier at 714, first computer system 702 performs an action at 716.

At 716, first computer system 702 performs the action (e.g., based on and/or in response to receiving the action identifier at 714). In some embodiments, the action corresponds to the action identifier communicated by second computer system 704. For example, where the action identifier is an identifier of input, first computer system 702 performs the action corresponding to the action identifier of a tap at user interface element 414 on smartwatch 410. For another example, where the action identifier is an identifier of an operation, first computer system 702 performs the action corresponding to the action identifier of the operation of launching a weather application.

In some embodiments, performing the action updates the display of the first computer system 702. For example, launching and/or selecting the weather application associated with user interface element 414 in FIG. 4 changes and/or updates the first user interface with the third user interface representative of the weather application. In some embodiments, in response to displaying an updated and/or changed user interface element at first computer system 702, first computer system 702 sends second user interface elements at 718 and/or sends second mapping of actions 720.

At 718, first computer system 702 sends updated second user interface elements to second computer system 704. For example, with reference to FIG. 4, sending updated user interface elements at 718 includes sending updated user interface element data for the second user interface when the weather application is launched. In some embodiments, sending updated user interface element data includes sending only user interface element data that changed and/or is updated from the previously sent user interface element data from 706. In some embodiments, sending updated user interface element data includes sending all the user interface element data (even if only some of the user interface element data changed and/or is updated). In some embodiments, the updated user interface element data is displayed on the first computer system 702.

At 720, first computer system 702 sends a second mapping of actions. In some embodiments, sending the second mapping of actions includes sending all mappings of actions. In some embodiments, sending the second mapping of actions includes sending updated mapping data for the second user interface compared to the first mapping of data sent at 708. For example, launching a weather application causes generation of (e.g., by first computer system 702) new UI elements with weather information and/or graphics of weather conditions that were not displayed before launching. The new UI elements can include new actions available at new locations and/or the same actions at a new location. In this example, first computer system 702 sends at 720 the second mapping which include the updated actions, updated UI elements, and/or updated locations in the second mapping of actions at 720.

Figure 8:
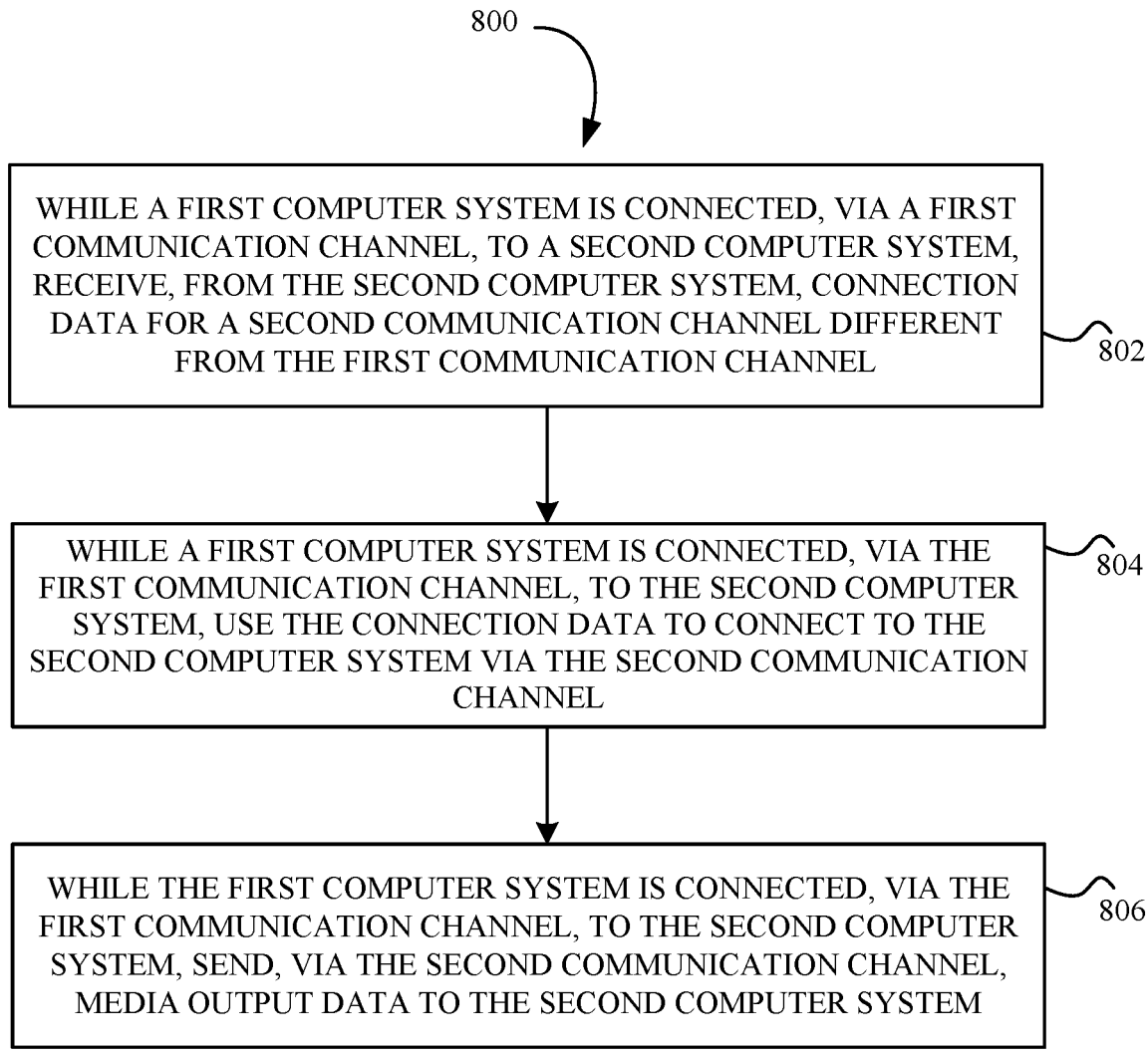
FIGS. 8 through 11 are flow diagrams illustrating methods for communicating data between devices, in accordance with some embodiments.

FIG. 8 is a flow diagram illustrating a method (e.g., method 800) for communicating between computer systems in accordance with some embodiments. Some operations in method 800 are, optionally, combined, the orders of some operations are, optionally, changed, and some operations are, optionally, omitted.

As described below, method 800 provides a technique for communicating between computer systems. Method 800 can provide a new and/or more effective way for communicating between computer systems, thereby creating a more efficient interface. For battery-operated computing devices, enabling communication between computer systems faster and more efficiently conserves power and increases the time between battery charges.

In some embodiments, method 800 is performed at a first computer system (e.g., a phone, computer, tablet, and/or wearable) (e.g., smartwatch 310, smartwatch 410, first computer system 602, first computer system 702, compute system 100, and/or device 200). In some embodiments, the first computer system is a phone, a watch, a tablet, a fitness tracking device, a wearable device, a television, a multimedia device, an accessory, a speaker, a head-mounted display (HMD), and/or a personal computing device. In some embodiments, the first computer system is in communication with input/output devices, such as one or more cameras, speakers, microphones, sensors, and/or display components (e.g., display 408).

At 802, while the first computer system is connected, via a first communication channel (e.g., a channel for sending and/or receiving data) (e.g., first communication channel 320, communication channel 430, and/or first communication channel in FIG. 6) (e.g., connect via first communication channel 606), to (e.g., transmits to, and/or receives from) a second computer system (e.g., a phone, computer, tablet, and/or wearable device) (e.g., smartphone 340, smartphone 440, second computer system 604, second computer system 704, compute system 100, and/or device 200), the first computer system receives, from the second computer system, connection data (e.g., data that enables a receiving device to connect to the second computer system, such as address and/or credential data) (e.g., first connection data 608) for a second communication channel (e.g., a channel for sending and/or receiving data) (e.g., second communication channel 330, communication channel 430, and/or second communication channel in FIG. 6)) different from the first communication channel (e.g., relies on different network and/or communication protocols, on different communication technologies (e.g., Wi-Fi versus Bluetooth, and/ or Bluetooth versus Near-Field Communication (NFC), using different network resources (e.g., frequencies, radio channels, antennas, hardware, software, scheduling, modulation, and/or demodulation techniques), and/or using different types of connection (e.g., ad hoc Wi-Fi network connection (e.g., peer-to-peer), and/or infrastructure network connection)). In some embodiments, the second computer system is a phone, a watch, a tablet, a fitness tracking device, a wearable device, a television, a multi-media device, an accessory, a speaker, a head-mounted display (HMD), and/or a personal computing device. In some embodiments, the second computer system is in communication with input/output devices, such as one or more cameras, speakers, microphones, sensors, and/or display components. In some embodiments, a communication channel refers to one or more of: a physical connection, a logical connection, and/or communication using a particular communication protocol.

At 804, while the first computer system is connected, via the first communication channel, to the second computer system, the first computer system uses the connection data (e.g., submitting a credential and/or connecting to a network address to join the second communication channel (e.g., response at 614)) to connect to (e.g., performing one or more operations for communicating with) the second computer system via the second communication channel (e.g., connect via second communication channel at 618).

At 806, while the first computer system is connected, via the first communication channel, to the second computer system, the first computer system sends, via the second communication channel, media output data (e.g., screen mirroring data (e.g., display data at 620), UI element data (e.g., physical and/or virtual controls) (e.g., plurality of user interface elements 412, 414, 416, and 418; and/or physical buttons 432 and 434; and/or rotatable input mechanism 436) (e.g., user interface element data at 622, first user-interface elements at 706), display data, and/or audio data) to the second computer system. In some embodiments, the first communication channel is established by a pairing between the first computer system and the second computer system (e.g., the first computer system and second computer system form a Bluetooth pair and connect via Bluetooth based on the existing pairing).

In some embodiments, receiving the connection data for the second communication channel comprises receiving, via the first communication channel, the connection data for the second communication channel (e.g., first connection data at 608). In some embodiments, the first computer system receives the connection data for the second communication channel via a third communication channel different from the first and second communication channels.

In some embodiments, using the connection data to connect to the second computer system comprises: in response to receiving the connection data via the first communication channel, the first computer system uses the connection data to connect to the second computer system (e.g., the connection data comprises a request, command, and/or instruction to the first computer system to connect using the connection data). In some embodiments, the first computer system automatically (e.g., without intervening user input to cause the content to be associated with another computer system) connects to the second computer system using the connection data.

In some embodiments, the connection data includes one or more selected from the group of: network information (e.g., information for identifying a network and/or establishing a connection with another computer system, such as network name, network address, port information, and/or network channel); and authentication information (e.g., credential, password, passcode, certificate, signature, and/or information usable to authenticate a computer system).

In some embodiments, subsequent to sending via the second communication channel, the media output data, the first computer system maintains (e.g., continues) display of the media output data. In some embodiments, the media output data is displayed concurrently with the first computer system sending, via the second communication channel, the media output data to the second computer system.

In some embodiments, the first computer system detects updated media output data (e.g., updated screen mirroring data, and/or updated UI element data (e.g., representing physical and/or virtual controls)). In some embodiments, the updated media output data is an update (e.g., the next frame displayed via the display generation component, and/or a change to the media output data) to the media output data. In some embodiments, the updated media output data is generated by the first computer system in response to an input (e.g., one or a plurality of inputs representing gestures, taps, and/or selections) that corresponds to selection of a user interface element (e.g., physical and/or virtual controls) included in the media output data. In some embodiments, in response to detecting the updated media output data, the first computer system sends (e.g., transmitting, and/or communicating), via the second communication channel, the updated media output data to the second computer system (e.g., updated display data at 632). In some embodiments, subsequent to sending the updated media output data, the second computer system displays (e.g., via a display component in communication with the second computer system) the updated media output data.

In some embodiments, in conjunction with (e.g., subsequent to, while, in accordance with, and/or prior to) sending the media output data via the second communication channel, the first computer system sends (e.g., transmits, and/or communicates), via the first communication channel, an identification of one or more user interface elements (e.g., physical and/or virtual controls) (e.g., plurality of user interface elements 412, 414, 416, and 418; physical buttons 432 and 434; and/or rotatable input mechanism 436) included in the media output data (e.g., user interface element data at 622). In some embodiments, the identification of the one or more user interface elements includes: a mapping (e.g., table 500) that includes one or more action identifiers mapped to the one or more user interface elements (e.g., available actions of FIG. 5). In some embodiments, the identification of the one or more user interface elements includes: an action mapped to each of one or more user interface elements. In some embodiments, the identification of the one or more user interface elements includes: multiple actions mapped to a user interface element. In some embodiments, the identification of the one or more user interface elements includes: multiple actions each mapped to multiple user interface elements. In some embodiments, a mapping includes data that describes functional capabilities (e.g., inputs, and/or actions) and/or location information (e.g., position, shape, and/or size) associated with the one or more user interface elements. In some embodiments, one or more action identifiers includes one or more identifiers of accepted inputs or operations associated with a user interface element on the first computer system.

In some embodiments, in conjunction with (e.g., subsequent to, while, in accordance with, and/or prior to) the first computer system sending the media output data via the second communication channel, the first computer system sends (e.g., communicating, and/or initiating), via the first communication channel, one or more action identifiers including an action identifier (e.g., functional capability (e.g., action) associated with the one or more user interface elements) (e.g., action identifier at 628, and/or action identifier at 714), wherein the one or more action identifiers correspond to the one or more user interface elements. In some embodiments, the first computer system receives, via the first communication channel, the action identifier. In some embodiments, in response to receiving the action identifier, the first computer system performs (e.g., executing, initiating, and/or causing to initiate) an action (e.g., the function associated with at least one user interface element of the one or more user interface elements) corresponding to the action identifier. In some embodiments, the action includes the selection (e.g., tap input, swipe input, rotation input, and/or press input) of one or more user interface elements. In some embodiments, the first computer system sends, via the second communication channel, updated media output data (e.g., screen mirroring data, UI element data (e.g., physical and/or virtual controls)) different from the media output data, while maintaining the first communication channel, wherein the updated media output data includes updated one or more user interface elements and updated one or more action identifiers (e.g., one or a plurality of action identifiers) different from the one or more action identifiers. In some embodiments, the updated media output data corresponds to performing the action corresponding to (e.g., is generated in response to) the action identifier. In some embodiments, the updated media output data is an update (e.g., the next frame displayed via the display generation component, a change to the media output data) to the media output data. In some embodiments, the updated one or more action identifiers correspond to the one or more updated user interface elements.

In some embodiments, the first communication channel uses a first communication protocol (e.g., Bluetooth protocol and/or Wi-Fi protocol) and the second communication channel does not use the first communication protocol. In some embodiments, a communication protocol is a wireless network protocol (e.g., Wi-Fi protocol, Bluetooth protocol, a mobile telecommunications protocol (e.g., 3G, 4G, LTE, 5G, and/or other 3rd Generation Partnership Project (3GPP) related protocols)). In some embodiments, a communication protocol is one or more of: an application layer protocol, a presentation layer protocol, a session layer protocol, a transport layer protocol, a network layer protocol, a data link layer protocol and/or a physical layer protocol. In some embodiments, the second communication channel uses a second communication channel that is different from the first communication channel (e.g., the first communication channel uses a Wi-Fi protocol to exchange data and the second communication channel uses a Bluetooth protocol to exchange data).

In some embodiments, the first communication channel and the second communication channel both use a second communication protocol (e.g., a communication protocol as described elsewhere herein).

In some embodiments, the first communication channel is encoded with a first encryption scheme (e.g., an encryption algorithm (e.g., symmetric and/or asymmetric)), and the second communication channel is encoded with a second encryption scheme (e.g., an encryption algorithm (e.g., symmetric and/or asymmetric)). In some embodiments, the first encryption scheme is different from the second encryption scheme. In some embodiments, the first encryption scheme and second encryption scheme are the same encryption scheme (e.g., same encryption algorithm) but include different keys and/or cyphers.

Note that details of the processes described above with respect to method 800 (e.g., FIG. 8) are also applicable in an analogous manner to other methods described herein. For example, method 800 optionally includes one or more of the characteristics of the various methods described below with reference to methods 900, 1000, and/or 1100. For example, method 800 can include (e.g., from 1002 of method 1000) sending to the second computer system a mapping that includes one or more action identifiers mapped to the one or more UI elements. In this example, sending the mapping that includes the one or more action identifiers enables the second computer system to send an action identifier corresponding to an action for the first computer system to perform. For brevity, these details are not repeated below.

Figure 9:
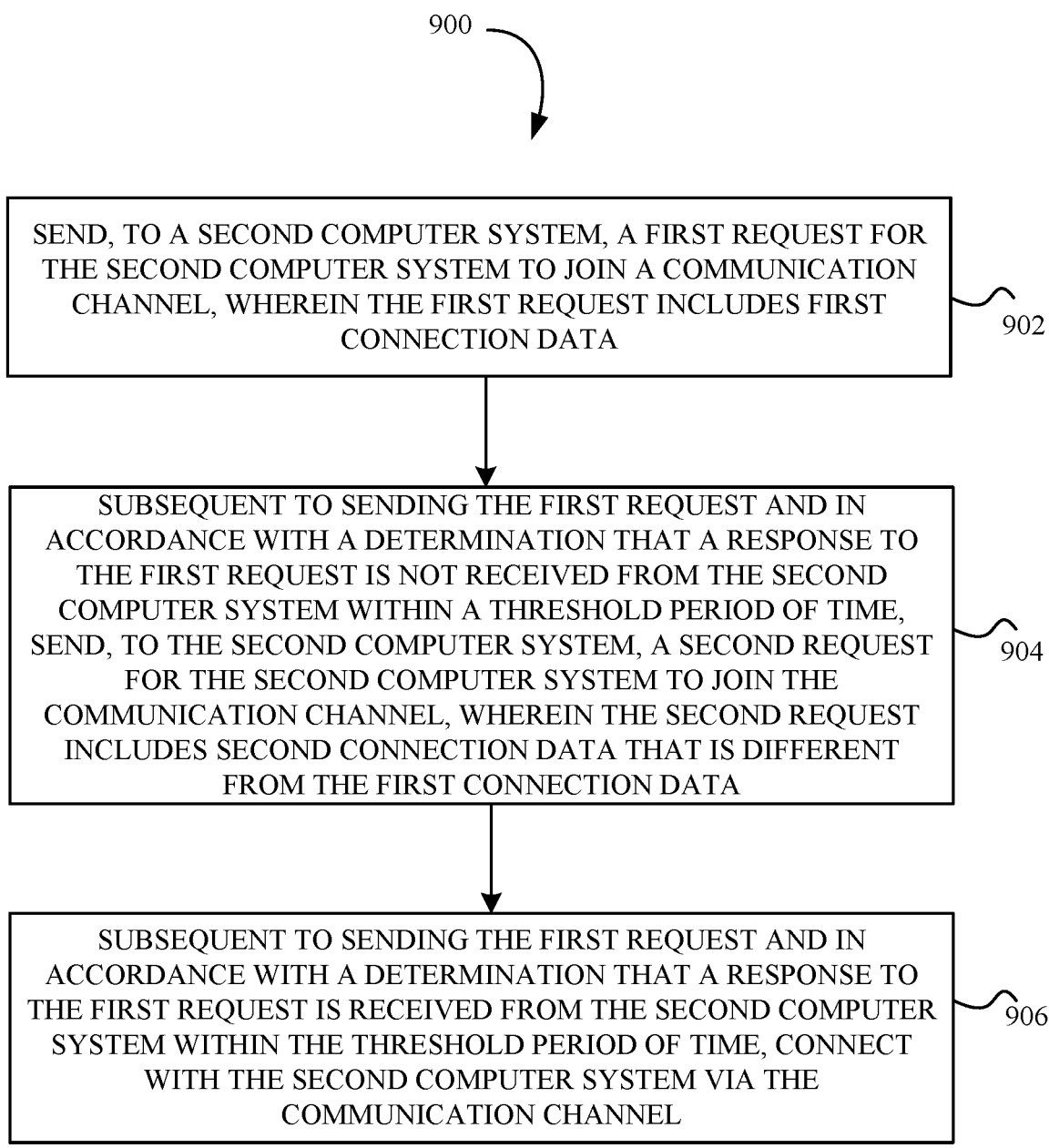

FIG. 9 is a flow diagram illustrating a method (e.g., method 900) for communicating between computer systems in accordance with some examples. Some operations in method 900 are, optionally, combined, the orders of some operations are, optionally, changed, and some operations are, optionally, omitted.

As described below, method 900 provides a technique for communicating between computer system. Method 900 can provide a new and/or more effective way for communicating between computer systems, thereby creating a more efficient interface. For battery-operated computing devices, enabling communication between computer systems faster and more efficiently conserves power and increases the time between battery charges.

In some embodiments, method 900 is performed at a first computer system (e.g., a phone, computer, tablet, and/or wearable) (e.g., smartphone 340; smartphone 440; second computer system 604; second computer system 704; compute system 100; and/or device 200). In some embodiments, the first computer system is a phone, a watch, a tablet, a fitness tracking device, a wearable device, a television, a multi-media device, an accessory, a speaker, a head-mounted display (HMD), and/or a personal computing device. In some embodiments, the first computer system is in communication with input/output devices, such as one or more cameras, speakers, microphones, sensors, and/or display components (e.g., display 408).

At 902, the first computer system sends, to a second computer system (e.g., a phone, computer, tablet, and/or wearable device) (e.g., smartwatch 310; smartwatch 410; first computer system 602; first computer system 702; compute system 100; and/or device 200), a first request (e.g., a command, and/or instruction) for the second computer system to join a communication channel (e.g., a channel for sending and/or receiving data) (e.g., communication channel 430, first communication channel 320, second communication channel 330, and/or first communication channel and/or second communication channel of FIG. 6), wherein the first request includes first connection data (e.g., data that enables a receiving device to connect to the second computer system such as address, network information, and/or credential data) (e.g., first connection data at 608). In some embodiments, the second computer system is a phone, a watch, a tablet, a fitness tracking device, a wearable device, a television, a multi-media device, an accessory, a speaker, a head-mounted display (HMD), and/or a personal computing device. In some embodiments, the second computer system is in communication with input/output devices, such as one or more cameras, speakers, microphones, sensors, and/or display components.

At 904, subsequent to (e.g., in response to, and/or in accordance with) sending the first request and in accordance with (e.g., in response to, and/or or subsequent to) a determination that a valid response (e.g., confirmation the second device joined the communication channel, and/or a confirmation the first request was received) (e.g., response at 614) is not received from the second computer system within a threshold period of time (e.g., a predetermined amount of time such as one minute, thirty seconds, ten minutes) (e.g., the credential is not the most recent at 636), the first computer system sends, to the second computer system, a second request (e.g., a second command and/or instruction) for the second computer system to join the communication channel (e.g., second connection data at 610), wherein the second request includes second connection data (e.g., data that enables a receiving device to connect to the second computer system, such as address and/or credential data) that is different from the first connection data. In some embodiments, the threshold period of time is the period of time from when the first request was sent (e.g., the threshold period of time is measured from the time of the corresponding request being sent). In some embodiments, the first computer system sends the second request to the second computer system, and in accordance with a determination that a valid response to the second request is not received within a second threshold period of time (e.g., a predetermined amount of time such as one minute, thirty seconds, ten minutes), the first computer system sends an additional request. In some embodiments, the first computer system continues to send additional requests in accordance with a determination that the valid response is not received within additional respective threshold periods of time (e.g., a predetermined amount of time such as one minute, thirty seconds, ten minutes) until a valid response is received in response to the respective request.

At 906, subsequent to (e.g., in response to, and/or in accordance with) sending the first request and in accordance with a determination that a valid response is received from the second computer system within the threshold period of time, the first computer system connects with the second computer system via the communication channel (e.g., starting a screen mirroring session via the communication channel) (e.g., connect via second communication channel at 618). In some embodiments, the threshold period of time is a dynamic period of time (e.g., the period of time lengthens (e.g., by 30 seconds, or by one minute) after each request without receiving the valid response from the second computer system). In some embodiments, the communication channel is a peer-to-peer connection (e.g., peer-to-peer Wi-Fi network and/or peer-to-peer Bluetooth connection) between the first computer system and the second computer system. In some embodiments, the communication channel is a connection via a third computer system (e.g., an intermediary computer system, a server, a network router, a phone, computer, tablet, and/or wearable device).

In some embodiments, prior to sending the first request for the second computer system to join the communication channel, the first computer system configures (e.g., establishes and/or initiates) the communication channel to generate the first connection data. In some embodiments, the first computer system configures the communication channel in response to detecting a command (e.g., input) for the second computer system to join the communication channel. In some embodiments, configuring the communication channel comprises one or more of: creating a network identifier (e.g., SSID), creating an address (e.g., network address), establishing a software access point, and/or initiating a network communication channel. In some embodiments, connection data comprises one or more of: a credential (e.g., network credential, password, passcode, and/or certificate) and/or information for connecting to a network.

In some embodiments, the first request includes a request to send, via the communication channel, (e.g., transmit and/or communicate) media output data (e.g., screen mirroring data, display data, audio data, and/or UI element data (e.g., physical and/or virtual controls)) from the second computer system to the first computer system via the communication channel. In some embodiments, the first request is a request to establish the communication channel using the first connection data.

In some embodiments, the first computer system subsequent to (e.g., in accordance with, and/or in response to) connecting with the second computer system via the communication channel, receiving media output data (e.g., screen mirroring data, display and/or audio data, and/or UI element data (e.g., physical and/or virtual controls)) from the second computer system via the communication channel.

In some embodiments, the determination that the valid response is received from the second computer system within the threshold period of time includes a determination that the valid response includes a valid credential (e.g., the most recent credential (network password, and/or network identifier) (e.g., check the credential is most recent at 616) corresponding to the most recent request). In some embodiments, a valid credential is time-limited (e.g., expires after a predetermined amount of time). In some embodiments, a valid credential is the most recently issued credential (e.g., if a subsequent credential is subsequently issued, then the prior-in-time credential ceases to be valid).

In some embodiments, the first connection data includes a first credential (e.g., password, passcode, and/or certificate). In some embodiments, the second connection data includes a second credential (e.g., password, passcode, and/or certificate) different from the first credential. In some embodiments, subsequent to sending the first request, the first credential is valid (e.g., the valid response includes receiving the first credential within the threshold period of time). In some embodiments, subsequent to sending the second request, the second credential is valid (e.g., the valid response includes receiving the second credential within a threshold period of time (e.g., the threshold period of time, and/or a second threshold period of time different from the threshold period of time)) and the first credential is not valid.

In some embodiments, the communication channel is a second communication channel (e.g., a channel for sending and/or receiving data). In some embodiments, while connected (e.g., subsequent to connecting) to the second computer system via the second communication channel (e.g., a channel for sending and/or receiving data), the first computer system maintains (e.g., not terminating the channel, keeping the channel open, and/or continuing communication via the channel) a connection with the second computer system via a first communication channel different from the second communication channel (e.g., a communication channel as described elsewhere herein). In some embodiments, prior to sending the first request, the first computer system connects with the second computer system via the first communication channel. In some embodiments, subsequent to sending the first request, the first computer system connects with the second computer system via the first communication channel.

In some embodiments, while connected to the second computer system via the first communication channel and the second communication channel: the first computer system receives, from the second computer system via the second communication channel, media output data (e.g., screen mirroring data (e.g., display data at 620), display data, audio data, and/or UI element data (e.g., physical and/or virtual controls) (e.g., plurality of user interface elements 412, 414, 416, and 418; and/or physical buttons 432 and 434; and/or rotatable input mechanism 436) (e.g., user interface element data at 622, first user interface elements at 706)). In some embodiments, the first computer system receives, from the second computer system, via the first communication channel, an identification of one or more user interface elements (e.g., physical and/or virtual controls) (e.g., an identification of one or more user interface elements as described elsewhere herein) included in the media output data. In some embodiments, the identification of the one or more user interface elements includes: a mapping (e.g., exemplary mapping in table 500) that includes one or more action identifiers mapped to the one or more user interface elements. In some embodiments, the identification of the one or more user interface elements includes: an action mapped to each of one or more user interface elements. In some embodiments, the identification of the one or more user interface elements includes: multiple actions mapped to a user interface element. In some embodiments, the identification of the one or more user interface elements includes: multiple actions each mapped to multiple user interface elements. In some embodiments, a mapping includes data that describes functional capabilities (e.g., inputs, and/or actions) and/or location information (e.g., position, shape, and/or size) associated with the one or more user interface elements. In some embodiments, one or more action identifiers includes one or more identifiers of accepted inputs or operations associated with a user interface element on the first computer system.

In some embodiments, the first connection data includes a network identifier (e.g., network name and/or information for identifying a network) and a first network credential (e.g., password, passcode, and/or certificate). In some embodiments, the second connection data include the network identifier and a second network credential (e.g., password, passcode, and/or certificate).

In some embodiments, the communication channel is a second communication channel (e.g., a channel for sending and/or receiving data) (e.g., a communication channel as described elsewhere herein). In some embodiments, sending the first request includes sending, via a first communication channel (e.g., a channel for sending and/or receiving data) (e.g., a communication channel as described elsewhere herein) different from the second communication channel to the second computer system, the first request. In some embodiments, sending the first request includes sending, via a third communication channel (e.g., a channel for sending and/or receiving data) (e.g., a communication channel as described elsewhere herein) different from the first and second communication channels to the second computer system, the first request.

In some embodiments, the second computer system is a wearable device (e.g., a watch, a ring, a fitness tracking device, and/or HMD).

In some embodiments, the threshold period of time is a first threshold period of time. In some embodiments, in accordance with (e.g., in response to, and/or subsequent to) a determination that a valid response to the second request is received from the second computer system within a second threshold period of time (e.g., a predetermined amount of time such as one minute, thirty seconds, ten minutes), the first computer system connects with the second computer system via the communication channel, wherein the first threshold period of time is different from the second threshold period of time. In some embodiments, the first threshold period of time occurs over a different timespan than the second threshold period of time (e.g., do not overlap in time, and/or begin and/or end at different respective times). In some embodiments, the first threshold period of time is a different length of time (e.g., a first time period is 30 seconds, and a second time period is 15 seconds; and/or a first time period is 30 minutes, and the second time period is one hour) from the second threshold period of time. In some embodiments, a threshold period of time associated with a subsequently sent request is shorter than a prior (e.g., immediately prior) threshold period of time associated with a prior request (e.g., continually shorter periods). In some embodiments, each threshold period of time is the same. In some embodiments, a threshold period of time associated with a subsequently sent request is longer than a prior (e.g., immediately prior) threshold period of time associated with a prior request (e.g., continually longer periods). In some embodiments, the first computer system continually sends request until a valid response is received. In some embodiments, the first computer system ceasing sending requests after a predetermined criteria is satisfied (e.g., number of failed requests reached, a total time has elapsed without a valid response, and/or a user input representing a request to cancel the communication channel setup).

Note that details of the processes described above with respect to method 900 (e.g., FIG. 9) are also applicable in an analogous manner to other methods described herein. For example, method 900 includes from optionally includes one or more of the characteristics of the various methods described above with reference to method 900. For example, method 900 includes from 804 of method 800 sending to the second computer system media output data to the second computer system via the second communication channel. In this example, sending media output data enables the first computer system to display a user interface of the second computer system using the connected communication channel of method 900. For brevity, these details are not repeated below.

Figure 10:
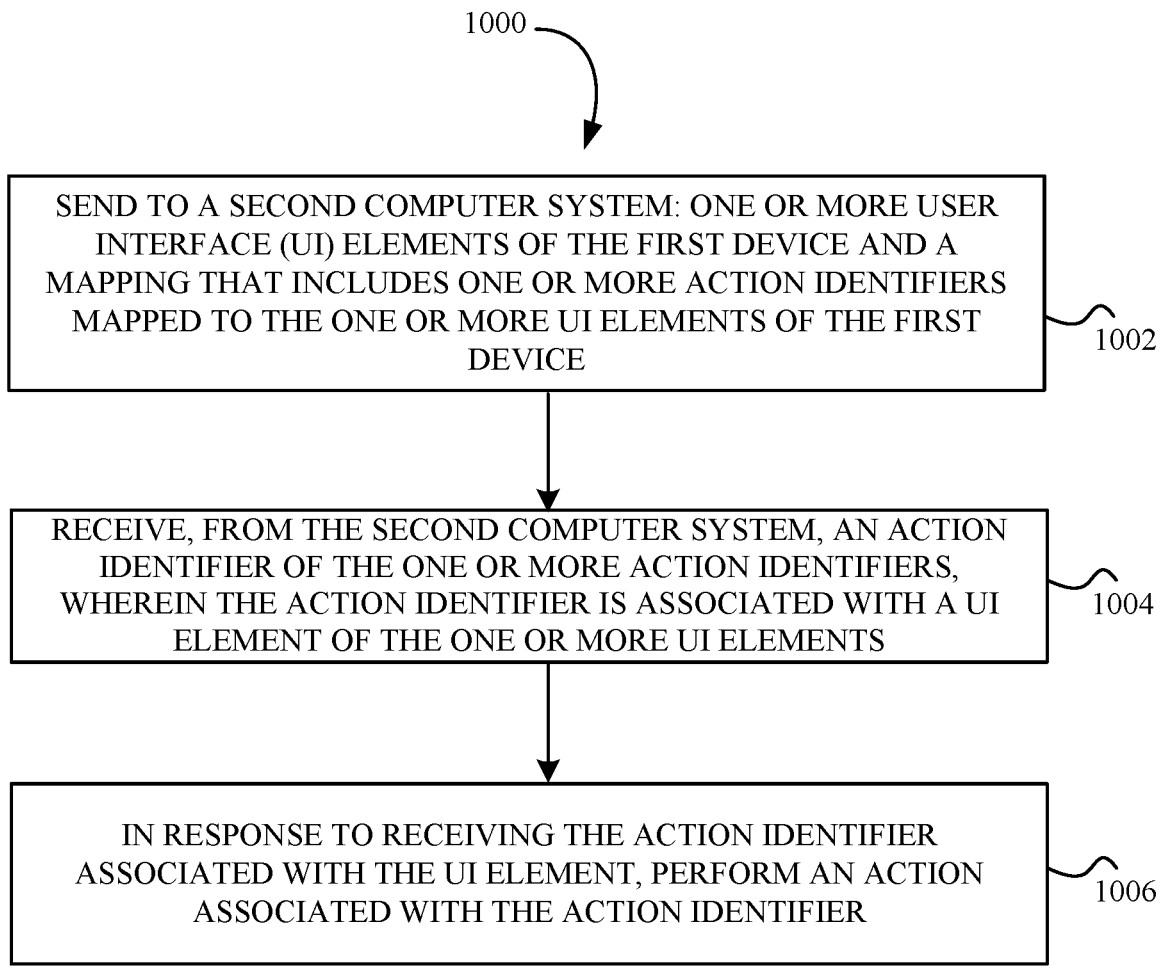

FIG. 10 is a flow diagram illustrating a method (e.g., method 1000) for communicating between devices in accordance with some examples. Some operations in method 1000 are, optionally, combined, the orders of some operations are, optionally, changed, and some operations are, optionally, omitted.

As described below, method 1000 provides an intuitive way for communicating between computer systems. Method 1000 can provide a new and/or more effective way for communicating between computer systems, thereby creating a more efficient interface. For battery-operated computing devices, enabling communication between computer systems faster and more efficiently conserves power and increases the time between battery charges In some embodiments, method 1000 is performed at a first computer system (e.g., a phone, computer, tablet, and/or wearable) (e.g., smartwatch 310; smartwatch 410; first computer system 602; first computer system 702; compute system 100; and/or device 200). In some embodiments, the first computer system is a phone, a watch, a tablet, a fitness tracking device, a wearable device, a television, a multimedia device, an accessory, a speaker, a head-mounted display (HMD), and/or a personal computing device. In some embodiments, the first computer system is in communication with input/output devices, such as one or more cameras, speakers, microphones, sensors, and/or display components (e.g., display 408).

At 1002, the first computer system sends (e.g., transmits and/or communicates) to a second computer system (e.g., a phone, computer, tablet, and/or wearable): one or more user interface (UI) elements (e.g., physical and/or virtual elements) of the first computer system (e.g., associated with and/or included in a UI of the first computer system, and/or displayed on a display of the first computer system); a mapping (e.g., data that describes functional capabilities (e.g., actions) and/or location information (e.g., position, shape, size, etc.) associated with the UI elements) that includes one or more action identifiers (e.g., identifiers of accepted inputs or operations associated with a UI element on the first computer system) corresponding to the one or more UI elements of the first computer system. In some embodiments, the second computer system is a phone, a watch, a tablet, a fitness tracking device, a wearable device, a television, a multi-media device, an accessory, a speaker, a head-mounted display (HMD), and/or a personal computing device. In some embodiments, the second computer system is in communication with input/output devices, such as one or more cameras, speakers, microphones, sensors, and/or display components. In some embodiments, sending one or more UI element comprises sending representations and/or identifiers of respective UI elements. In some embodiments, a UI element is a representation of an element that is associated with a UI. In some embodiments, a UI element of the first computer system is a representation of an element that is associated with a UI of the first computer system. In some embodiments, a UI element is displayed as part of a displayed UI (e.g., the UI element is a virtual control displayed within a user interface on the first computer system). In some embodiments, a UI element is an input control associated with (e.g., mapped to) a displayed UI (e.g., the UI element is a physical control (e.g., button, rotatable input mechanism) that can be used to detect an input associated with the displayed UI. In some embodiments, the mapping and/or the one or more UI elements are an identification of one or more UI elements. In some embodiments, the mapping that includes one or more action identifiers mapped to one or more user interface elements. In some embodiments, the identification of the one or more user interface elements includes: an action mapped to each of one or more user interface elements. In some embodiments, the identification of the one or more user interface elements includes: multiple actions mapped to a user interface element. In some embodiments, the identification of the one or more user interface elements includes: multiple actions each mapped to multiple user interface elements. In some embodiments, a mapping includes data that describes functional capabilities (e.g., inputs, and/or actions) and/or location information (e.g., position, shape, and/or size) associated with the one or more user interface elements. In some embodiments, one or more action identifiers includes one or more identifiers of accepted inputs or operations associated with a user interface element on the first computer system.

At 1004, the first computer system receives, from a second computer system, an action identifier (e.g., a unique and/or descriptive identification of an action) (e.g., an action identifier as described elsewhere herein) (e.g., action identifier at 714) of the one or more action identifiers, wherein the action identifier is associated with a UI element of the one or more UI elements (e.g., receiving an indication of an action, an operation, and/or an indication of a particular UI element that the action corresponds to (e.g., a input representing a tap on an accept control)).

At 1006, in response to receiving the action identifier associated with the UI element, the first computer system performs an action (e.g., an input and/or an operation) associated with the action identifier (e.g., perform action at 630, perform action at 716). In some embodiments, the first computer system sends one or more UI elements including an identifier of the UI element displayed on the first computer system. In some embodiments, sending the mapping of the one or more actions (e.g., first mapping of actions at 708) includes an identifier of the action for each of the one or more UI elements of the first computer system. In some embodiments, performing an input comprises causing the first computer system to register an input (e.g., into the UI) as if it had been received directly at the first computer system. In some embodiments, performing an operation (e.g., associated with an input) comprises performing an operation that is configured to be performed in response to an input (e.g., the result of an input).

In some embodiments, the first computer system is in communication with a display generation component (e.g., a display, a touch-sensitive surface, a projector, and/or a component that can output visual content) and the one or more UI elements are displayed in a user interface via the display generation component.

In some embodiments, the mapping includes a set of one or more locations (e.g., the placement, coordinates, and/or a plurality of coordinates corresponding to the bounds of a frame (e.g., the size of the elements) of each of the one or more UI elements of the first computer system) (e.g., location in FIG. 5), with respect to the user interface, of the one or more UI elements in the user interface.

In some embodiments, the one or more UI elements includes one or more selected from the group of: one or more indications of physical UI elements (e.g., a button, a rotatable input mechanism, and/or a physical toggle) of the first computer system; and one or more indications of virtual UI elements (e.g., affordance, graphic, and/or virtual control) of the first computer system.

In some embodiments, the action is a type of input. In some embodiments, a type of input includes one or more selected from the group of: an input representing a selection (e.g., a touch input, a press and hold input, and/or tap input), and an input representing a rotation.

In some embodiments, the mapping includes a plurality of action identifiers mapped to a UI element (e.g., at least one UI element) of the one or more UI elements. In some embodiments, the plurality of action identifiers are mapped to a plurality of UI elements of the one or more UI elements. In some embodiments, a selection (e.g., a set, and/or more than one) of the plurality of action identifiers are mapped to one or more UI elements of the set of one or more UI elements.

In some embodiments, in response to performing the action associated with the action identifier, the first computer system sends to the second computer system updates to the one or more UI elements (e.g., changes to the one or more UI elements, displayed in response to performing the action). In some embodiments, the updates to the one or more UI elements include one or more (e.g., one, a few, and/or all) of the one or more UI elements that changed.

In some embodiments, in response to performing the action associated with the action identifier, the first computer system sends to the second computer system updates to the mapping (e.g., changes to the action identifiers) include one or more action identifiers corresponding to the updates to the one or more UI elements. In some embodiments, the updates to the mapping include one or more (e.g., one, a few, and/or all) of the mapping of the one or more action identifiers that changed.

Note that details of the processes described above with respect to method 1000 (e.g., FIG. 10) are also applicable in an analogous manner to other methods described herein. For example, method 1000 optionally includes one or more of the characteristics of the various methods described above and below, for example methods 800, 900, and/or 1100. For example, the techniques of method 1100 can be used to detect an input associated with the UI element of the one or more UI elements, wherein the input is a second type of input that is different from the first type of input, and send to the second computer system the action identifier associated with the first type of input. This characteristic can enable method 1000 to detect an input of a different type than the mapping. For brevity, these details are not repeated below.

Figure 11:
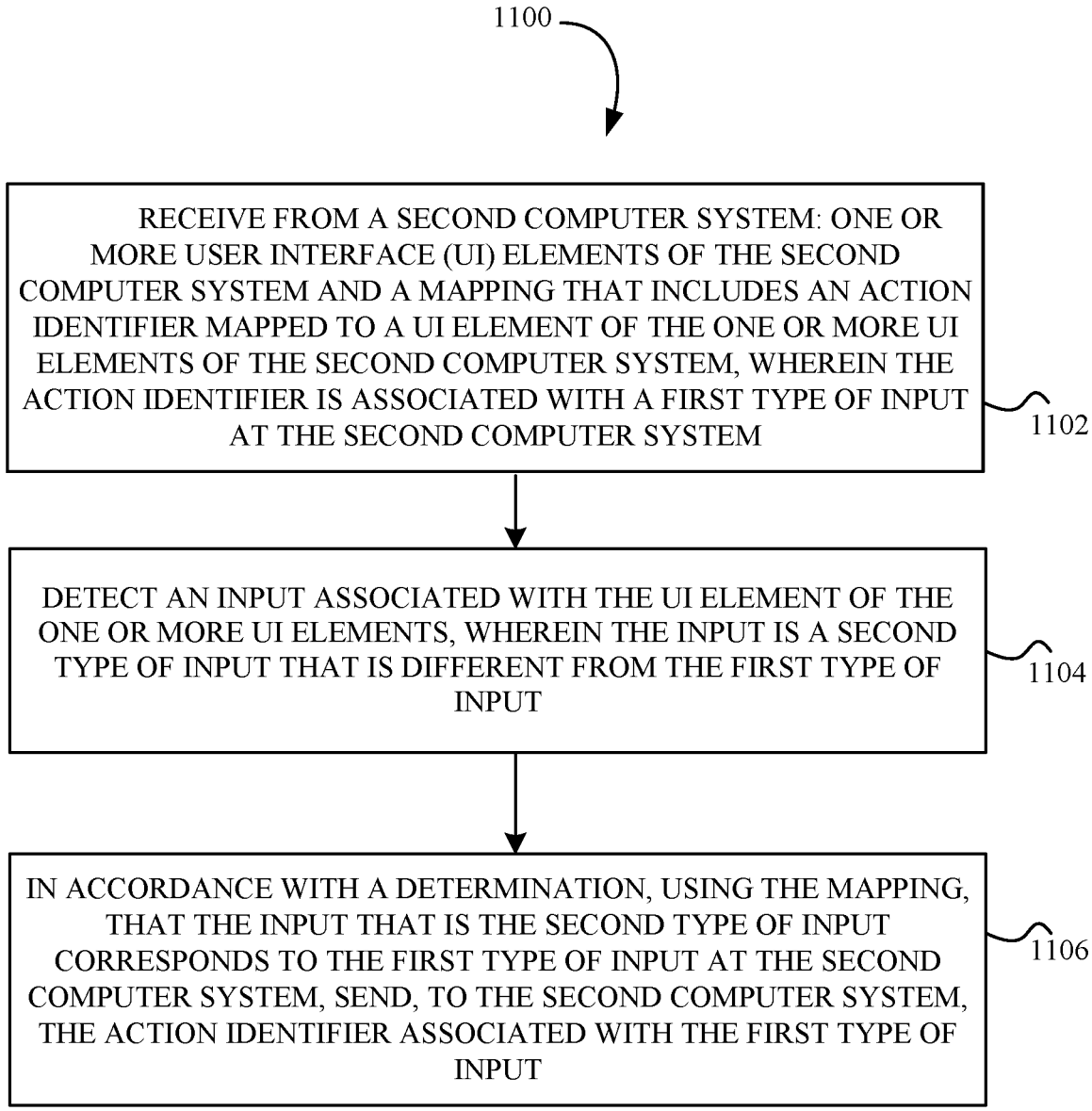

FIG. 11 is a flow diagram illustrating a method (e.g., method 1100) for communicating between devices in accordance with some examples. Some operations in method 1100 are, optionally, combined, the orders of some operations are, optionally, changed, and some operations are, optionally, omitted.

As described below, method 1100 provides an intuitive way for communicating between computer systems. Method 1100 can provide a new and/or more effective way for communicating between computer systems, thereby creating a more efficient interface. For battery-operated computing devices, enabling communication between computer systems faster and more efficiently conserves power and increases the time between battery charges.

In some embodiments, method 1100 is performed at a first computer system (e.g., a phone, computer, tablet, and/or wearable) (e.g., smartphone 340; smartphone 440; second computer system 604; second computer system 704; compute system 100; and/or device 200). In some embodiments, the first computer system is a phone, a watch, a tablet, a fitness tracking device, a wearable device, a television, a multi-media device, an accessory, a speaker, a head-mounted display (HMD), and/or a personal computing device. In some embodiments, the first computer system is in communication with input/output devices, such as one or more cameras, speakers, microphones, sensors, and/or display components.

At 1102, the first computer system receives from a second computer system (e.g., a phone, computer, tablet, and/or wearable) (e.g., smartwatch 310; smartwatch 410; first computer system 602; first computer system 702; compute system 100; and/or device 200): one or more user interface elements of the second computer system; and a mapping (e.g., data that describes functional capabilities (e.g., actions) and/or location information (e.g., position, shape, size, etc.) associated with UI elements) (e.g., a mapping as described in FIG. 5) that includes an action identifier mapped to a UI element of the one or more UI elements (e.g., physical and/or virtual controls) of the second computer system (smartphone 340; smartphone 440; second computer system 604; second computer system 704; compute system 100; and/or device 200), wherein the action identifier is associated with a first type of input at the second computer system (e.g., button press, rotation of a rotatable input mechanism, and/or touch) (e.g., first mapping of actions at 708). In some embodiments, the second computer system is a phone, a watch, a tablet, a fitness tracking device, a wearable device, a television, a multi-media device, an accessory, a speaker, a head-mounted display (HMD), and/or a personal computing device. In some embodiments, the second computer system is in communication with input/output devices, such as one or more cameras, speakers, microphones, sensors, and/or display components. In some embodiments, the mapping of the one or more action identifiers to the one or more UI elements includes one or more identifiers of: an action (e.g., an operation) mapped to each of the one or more UI elements, multiple actions mapped to a user interface element, multiple actions each mapped to multiple user interface elements. In some embodiments, a mapping includes one or more actions for each of the UI elements (e.g., of a user interface of the second computer system). In some embodiments, the mapping includes one or more actions for fewer than all user interface elements (e.g., of a user interface of the second computer system).

At 1104, the first computer system detects an input associated with (e.g., directed to, at a location of, associated with a location of, mentioned by, identified in, and/or in a direction of) the UI element of the one or more UI elements, wherein the input is a second type of input (e.g., voice input, or a hand gesture input (e.g., captured by a camera)) that is different from the first type of input (e.g., a tap input, or a tap and hold input) (e.g., receive input at 624 and at 710). In some embodiments, a type of input is based at least in part on a mechanism used to detect the input (e.g., a touch-sensitive surface, a physical button, a microphone, and/or a light-sensing device (e.g., camera)). In some embodiments, a type of input is based at least in part on a characteristic of the input (e.g., length of time a touch or press is detected (e.g., which can differentiate between a tap input versus a tap and hold input), an amount of movement after a touch event (e.g., which can differentiate between a tap and a swipe), a magnitude of movement, a location of the input, a force of the input, a speed of the input, and/or a location of the beginning of the input (e.g., which can differentiate an edge swipe input from a non-edge swipe input)). In some embodiments, a type of input is based on at least in part on a characteristic of the input and at least in part on the mechanism used to detect the input (e.g., a tap input on a touch-sensitive surface, a tap and hold input on the touch-sensitive surface, a press input of a physical button, a press and hold input of a physical button, and voice input to a microphone are each considered different types of inputs).

At 1106, in accordance with (e.g., in response to, and/or subsequent to) a determination, using the mapping, that the input that is the second type of input corresponds to (e.g., represents a request to perform) the first type of input at the second computer system (e.g., using the mapping to translate the input that is the second type into an identifier of an action of a first type associated with a UI element) (e.g., determine action identifier at 626 and at 712), the first computer system sends, to the second computer system, the action identifier associated with the first type of input (e.g., action identifier at 628 and at 714). In some embodiments, a determination, using a mapping, that a (e.g., received) type of input corresponds to a different type of input includes a determination of an intent that the type of input represent the second type of input (e.g., a touch on a virtual representation of physical button can represent intent to register an input of the physical button, and/or a voice input to tap a virtual control can represent intent to register a tap input of the virtual control).

In some embodiments, the one or more UI elements includes one or more selected from the group of: one or more indications of physical UI elements (e.g., a physical control such as a button, a rotatable input mechanism, and/or a physical toggle) of the second computer system; and one or more indications of virtual UI elements (e.g., a virtual control such as an affordance, graphic, and/or virtual button) of the second computer system.

In some embodiments, the second computer system is in communication with a display generation component (e.g., a display, a touch-sensitive surface, a projector, and/or a component that can output visual content). In some embodiments, the UI element is displayed in a user interface via the display generation component.

In some embodiments, the mapping includes a set of one or more locations (e.g., the placement, coordinates, and/or a plurality of coordinates corresponding to the bounds of a frame (e.g., the size of the elements) of each of the one or more UI elements of the second computer system), with respect to the user interface, of the UI element in the user interface (e.g., one or more locations as shown in table 500 of FIG. 5).

In some embodiments, receiving, from the second computer system, the one or more UI elements is via a second communication channel (e.g., a channel for sending and/or receiving data) (communication channel 430, second communication channel 330, and/or second communication channel of FIG. 6), between the first computer system and the second computer system. In some embodiments, receiving, from the second computer system, the mapping is via a first communication channel (e.g., a channel for sending and/or receiving data) (communication channel 430, first communication channel 320, and/or first communication channel of FIG. 6), between the first computer system and the second computer system. In some embodiments, the first communication channel is different from the second communication channel. In some embodiments, prior to sending the first request, the first computer system connects with the second computer system via the first communication channel.

In some embodiments, displaying, via the display generation component, the UI element is performed concurrently with the second computer system displaying, via a different display generation component, the UI element.

In some embodiments, in accordance with (e.g., in response to, and/or subsequent to) a determination, using the mapping, that the input that is the second type of input does not correspond to the first type of input at the second computer system, the first computer system forgoes sending, to the second computer system, the action identifier associated with the first type of input.

In some embodiments, the first type of input is a touch input (e.g., a tap input, a tap and hold input, a press input, a selection, and/or a slide). In some embodiments, the second type of input is an audio input (e.g., a voice input, and/or a voice command). In some embodiments, the one or more UI elements include an indication of physical UI elements (e.g., a button, a rotatable input mechanism, and/or a physical toggle) and the input of the first type is an input on at least one of the indications of physical UI elements.

In some embodiments, the first computer system is in communication with a display generation component (e.g., a display, a touch-sensitive surface, a projector, and/or a component that can output visual content). In some embodiments, the first computer system displays, via the display generation component, the UI element of the one or more UI elements.

Note that details of the processes described above with respect to method 1100 (e.g., FIG. 11) are also applicable in an analogous manner to the methods described herein. For example, method 1100 optionally includes one or more of the characteristics of the various methods described above with reference to method 1100. For example, method 1100 can include techniques of method 900 such as, subsequent to sending the first request and in accordance with a determination that a response to the first request is received from the second computer system within the threshold period of time, connecting with the second computer system via the communication channel. For brevity, these details are not repeated below.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve communicating data between devices. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be exchanged between computer systems. Accordingly, use of such personal information data enables computer systems to connect and provide additional and/or extensions to functionality. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method comprising:
at a first computer system:
while the first computer system is connected, via a first communication channel, to a second computer system:
receiving, from the second computer system, a message including:
a request to initiate a mirroring session with the first computer system;
a request to send screen mirroring data; and
connection data for a second communication channel different from the first communication channel;
using the connection data to connect to the second computer system via the second communication channel, wherein using the connection data to connect to the second computer system includes initiating, by the first computer system using the connection data, the second communication channel with the second computer system; and
sending, via the second communication channel, media output data to the second computer system, wherein the first communication channel is maintained after sending the media output data to the second computer system.

2. The method of claim 1, wherein receiving the connection data for the second communication channel comprises receiving, via the first communication channel, the connection data for the second communication channel.

3. The method of claim 2, wherein using the connection data to connect to the second computer system comprises:
in response to receiving the connection data via the first communication channel, using the connection data to connect to the second computer system.

4. The method of claim 1, wherein the connection data includes one or more selected from the group of:
network information; and
authentication information.

5. The method of claim 1, wherein the first computer system is in communication with a display generation component, and wherein the method further comprises:
displaying, via the display generation component, the media output data; and
subsequent to sending via the second communication channel, the media output data, maintaining display of the media output data.

6. The method of claim 1, further comprising:
detecting updated media output data; and
in response to detecting the updated media output data, sending, via the second communication channel, the updated media output data to the second computer system.

7. The method of claim 6, wherein the first communication channel is maintained after sending the updated media output data to the second computer system.

8. The method of claim 1, further comprising:
in conjunction with sending the media output data via the second communication channel, sending, via the first communication channel, an identification of one or more user interface elements included in the media output data.

9. The method of claim 8, further comprising:
in conjunction with sending the media output data via the second communication channel, sending, via the first communication channel, one or more action identifiers including an action identifier, wherein the one or more action identifiers correspond to the one or more user interface elements;
receiving, via the first communication channel, the action identifier;
in response to receiving the action identifier, performing an action corresponding to the action identifier; and
sending, via the second communication channel, updated media output data different from the media output data, while maintaining the first communication channel, wherein the updated media output data includes updated one or more user interface elements and updated one or more action identifiers different from the one or more action identifiers.

10. The method of claim 8, wherein the one or more user interface elements include a user interface element currently displayed by the first computer system.

11. The method of claim 1, wherein the first communication channel uses a first wireless communication protocol, and wherein the second communication channel does not use the first wireless communication protocol.

12. The method of claim 1, wherein the first communication channel is encoded with a first encryption scheme, and the second communication channel is encoded with a second encryption scheme, wherein the first encryption scheme is different from the second encryption scheme.

13. The method of claim 1, further comprising:
while the first computer system is connected, via the first communication channel, to the second computer system and before the first computer system is connected, via the second communication channel, to the second computer system, exchanging, via the first communication channel, data of a first type, wherein the first type is a different type of data than the media output data, wherein the first type includes notifications, messages, images, calendar data, or any combination thereof; and
while the first computer system is connected, via the first communication channel and the second communication channel, to the second computer system, exchanging, via the first communication channel, data of the first type.

14. The method of claim 1, wherein the second communication channel corresponds to a mirroring session between the first computer system and the second computer system, the method further comprising:
while the first computer system is connected, via the first communication channel and the second communication channel, to the second computer system, sending, via the first communication channel, data corresponding to the mirroring session.

15. The method of claim 14, wherein the data corresponding to the mirroring session includes user interface element data corresponding to one or more user interface elements included in the media output data.

16. The method of claim 1, further comprising:
in conjunction with sending the media output data via the second communication channel, sending, via the first communication channel, an identification of one or more physical input devices of the first computer system.

17. The method of claim 1, further comprising:
in conjunction with sending the media output data, causing the second computer system to display a representation of the first computer system.

18. The method of claim 17, wherein displaying the representation of the first computer system includes a representation of one or more physical input devices of the first computer system.

19. A non-transitory computer-readable storage medium storing one or more programs configured to be executed by one or more processors of a first computer system, the one or more programs including instructions for:
while the first computer system is connected, via a first communication channel, to a second computer system:
receiving, from the second computer system, a message including:
a request to initiate a mirroring session with the first computer system;
a request to send screen mirroring data; and
connection data for a second communication channel different from the first communication channel;
using the connection data to connect to the second computer system via the second communication channel, wherein using the connection data to connect to the second computer system includes initiating, by the first computer system using the connection data, the second communication channel with the second computer system; and
sending, via the second communication channel, media output data to the second computer system, wherein the first communication channel is maintained after sending the media output data to the second computer system.

20. The non-transitory computer-readable storage medium of claim 19, wherein receiving the connection data for the second communication channel comprises receiving, via the first communication channel, the connection data for the second communication channel.

21. The non-transitory computer-readable storage medium of claim 20, wherein using the connection data to connect to the second computer system comprises:
in response to receiving the connection data via the first communication channel, using the connection data to connect to the second computer system.

22. The non-transitory computer-readable storage medium of claim 19, wherein the connection data includes one or more selected from the group of:
network information; and
authentication information.

23. The non-transitory computer-readable storage medium of claim 19, wherein the first computer system is in communication with a display generation component, the one or more programs further including instructions for:
displaying, via the display generation component, the media output data; and
subsequent to sending via the second communication channel, the media output data, maintaining display of the media output data.

24. The non-transitory computer-readable storage medium of claim 19, the one or more programs further including instructions for:
detecting updated media output data; and
in response to detecting the updated media output data, sending, via the second communication channel, the updated media output data to the second computer system.

25. The non-transitory computer-readable storage medium of claim 24, wherein the first communication channel is maintained after sending the updated media output data to the second computer system.

26. The non-transitory computer-readable storage medium of claim 19, the one or more programs further including instructions for:
in conjunction with sending the media output data via the second communication channel, sending, via the first communication channel, an identification of one or more user interface elements included in the media output data.

27. The non-transitory computer-readable storage medium of claim 26, the one or more programs further including instructions for:
in conjunction with sending the media output data via the second communication channel, sending, via the first communication channel, one or more action identifiers including an action identifier, wherein the one or more action identifiers correspond to the one or more user interface elements;
receiving, via the first communication channel, the action identifier;
in response to receiving the action identifier, performing an action corresponding to the action identifier; and
sending, via the second communication channel, updated media output data different from the media output data, while maintaining the first communication channel, wherein the updated media output data includes updated one or more user interface elements and updated one or more action identifiers different from the one or more action identifiers.

28. The non-transitory computer-readable storage medium of claim 26, wherein the one or more user interface elements include a user interface element currently displayed by the first computer system.

29. The non-transitory computer-readable storage medium of claim 19, wherein the first communication channel uses a first wireless communication protocol, and wherein the second communication channel does not use the first wireless communication protocol.

30. The non-transitory computer-readable storage medium of claim 19, wherein the first communication channel is encoded with a first encryption scheme, and the second communication channel is encoded with a second encryption scheme, wherein the first encryption scheme is different from the second encryption scheme.

31. The non-transitory computer-readable storage medium of claim 19, the one or more programs further including instructions for:
while the first computer system is connected, via the first communication channel, to the second computer system and before the first computer system is connected, via the second communication channel, to the second computer system, exchanging, via the first communication channel, data of a first type, wherein the first type is a different type of data than the media output data, wherein the first type includes notifications, messages, images, calendar data, or any combination thereof; and while the first computer system is connected, via the first communication channel and the second communication channel, to the second computer system, exchanging, via the first communication channel, data of the first type.

32. The non-transitory computer-readable storage medium of claim 19, wherein the second communication channel corresponds to a mirroring session between the first computer system and the second computer system, the one or more programs further including instructions for:

while the first computer system is connected, via the first communication channel and the second communication channel, to the second computer system, sending, via the first communication channel, data corresponding to the mirroring session.

33. The non-transitory computer-readable storage medium of claim 32, wherein the data corresponding to the mirroring session includes user interface element data corresponding to one or more user interface elements included in the media output data.

34. The non-transitory computer-readable storage medium of claim 19, the one or more programs further including instructions for:

in conjunction with sending the media output data via the second communication channel, sending, via the first communication channel, an identification of one or more physical input devices of the first computer system.

35. The non-transitory computer-readable storage medium of claim 19, the one or more programs further including instructions for:

in conjunction with sending the media output data, causing the second computer system to display a representation of the first computer system.

36. The non-transitory computer-readable storage medium of claim 19, wherein displaying the representation of the first computer system includes a representation of one or more physical input devices of the first computer system.

37. A first computer system, comprising:
one or more processors; and
memory storing one or more programs configured to be executed by the one or more processors, the one or more programs including instructions for:
while the first computer system is connected, via a first communication channel, to a second computer system:
receiving, from the second computer system, a message including:
a request to initiate a mirroring session with the first computer system;
a request to send screen mirroring data; and
connection data for a second communication channel different from the first communication channel;
using the connection data to connect to the second computer system via the second communication channel, wherein using the connection data to connect to the second computer system includes initiating, by the first computer system using the connection data, the second communication channel with the second computer system; and
sending, via the second communication channel, media output data to the second computer system, wherein the first communication channel is maintained after sending the media output data to the second computer system.

38. The first computer system of claim 37, wherein receiving the connection data for the second communication channel comprises receiving, via the first communication channel, the connection data for the second communication channel.

39. The first computer system of claim 38, wherein using the connection data to connect to the second computer system comprises:
in response to receiving the connection data via the first communication channel, using the connection data to connect to the second computer system.

40. The first computer system of claim 37, wherein the connection data includes one or more selected from the group of:
network information; and
authentication information.

41. The first computer system of claim 37, wherein the first computer system is in communication with a display generation component, the one or more programs further including instructions for:
displaying, via the display generation component, the media output data; and
subsequent to sending via the second communication channel, the media output data, maintaining display of the media output data.

42. The first computer system of claim 37, the one or more programs further including instructions for:
detecting updated media output data; and
in response to detecting the updated media output data, sending, via the second communication channel, the updated media output data to the second computer system.

43. The first computer system of claim 42, wherein the first communication channel is maintained after sending the updated media output data to the second computer system.

44. The first computer system of claim 37, the one or more programs further including instructions for:
in conjunction with sending the media output data via the second communication channel, sending, via the first communication channel, an identification of one or more user interface elements included in the media output data.

45. The first computer system of claim 44, the one or more programs further including instructions for:
in conjunction with sending the media output data via the second communication channel, sending, via the first communication channel, one or more action identifiers including an action identifier, wherein the one or more action identifiers correspond to the one or more user interface elements;
receiving, via the first communication channel, the action identifier;
in response to receiving the action identifier, performing an action corresponding to the action identifier; and
sending, via the second communication channel, updated media output data different from the media output data, while maintaining the first communication channel, wherein the updated media output data includes updated one or more user interface elements and updated one or more action identifiers different from the one or more action identifiers.

46. The first computer system of claim 44, wherein the one or more user interface elements include a user interface element currently displayed by the first computer system.

47. The first computer system of claim 37, wherein the first communication channel uses a first wireless communication protocol, and wherein the second communication channel does not use the first wireless communication protocol.

48. The first computer system of claim 37, wherein the first communication channel is encoded with a first encryption scheme, and the second communication channel is encoded with a second encryption scheme, wherein the first encryption scheme is different from the second encryption scheme.

49. The first computer system of claim 37, the one or more programs further including instructions for:
while the first computer system is connected, via the first communication channel, to the second computer system and before the first computer system is connected, via the second communication channel, to the second computer system, exchanging, via the first communication channel, data of a first type, wherein the first type is a different type of data than the media output data, wherein the first type includes notifications, messages, images, calendar data, or any combination thereof; and
while the first computer system is connected, via the first communication channel and the second communication channel, to the second computer system, exchanging, via the first communication channel, data of the first type.

50. The first computer system of claim 37, wherein the second communication channel corresponds to a mirroring session between the first computer system and the second computer system, the one or more programs further including instructions for:
while the first computer system is connected, via the first communication channel and the second communication channel, to the second computer system, sending, via the first communication channel, data corresponding to the mirroring session.

51. The first computer system of claim 50, wherein the data corresponding to the mirroring session includes user interface element data corresponding to one or more user interface elements included in the media output data.

52. The first computer system of claim 37, the one or more programs further including instructions for:
in conjunction with sending the media output data via the second communication channel, sending, via the first communication channel, an identification of one or more physical input devices of the first computer system.

53. The first computer system of claim 37, the one or more programs further including instructions for:
in conjunction with sending the media output data, causing the second computer system to display a representation of the first computer system.

54. The first computer system of claim 37, wherein displaying the representation of the first computer system includes a representation of one or more physical input devices of the first computer system.

* * * * *